United States Patent [19]
Kojima et al.

[11] Patent Number: 5,446,662
[45] Date of Patent: Aug. 29, 1995

[54] SUSPENSION CONTROL DEVICE FOR VEHICLE, TUNING METHOD FOR SPRING RATE OF SUSPENSION, AND TUNING METHOD FOR DAMPING RATE THEREOF

[75] Inventors: Yoshio Kojima; Osamu Murata; Hirobumi Ohta, all of Aichi, Japan

[73] Assignee: Kabushiki Kaisha Toyota Chuo Kenkyusho, Aichi, Japan

[21] Appl. No.: 250,689

[22] Filed: May 27, 1994

[30] Foreign Application Priority Data

May 27, 1993 [JP] Japan .................. 5-151056
Dec. 28, 1993 [JP] Japan .................. 5-350843

[51] Int. Cl.⁶ .................. B60G 17/00; B60G 21/00
[52] U.S. Cl. .................. 364/424.05; 364/426.04; 280/840; 280/6.1; 180/41
[58] Field of Search .................. 384/424.05, 426.04, 384/562, 565; 280/707, 688, 840, 6.1, 6.11; 73/11.04, 11.05, 11.07, 862.38; 188/378, 379, 380, 322.17; 267/195; 180/41

[56] References Cited

U.S. PATENT DOCUMENTS

| | | | |
|---|---|---|---|
| 4,671,534 | 6/1987 | Yano | 280/707 |
| 4,722,548 | 2/1988 | Hamilton et al. | 280/707 |
| 4,881,172 | 11/1989 | Miller | 364/424..05 |
| 4,916,632 | 4/1990 | Doi et al. | 364/508 |
| 4,970,645 | 11/1990 | Adachi et al. | 364/424.05 |
| 5,142,477 | 8/1992 | Tsutsumi et al. | 364/424.05 |
| 5,163,702 | 11/1992 | Wood et al. | 280/703 |
| 5,173,858 | 12/1992 | Wada et al. | 364/424.05 |
| 5,231,583 | 7/1993 | Lizell | 364/424.05 |
| 5,243,525 | 9/1993 | Tsutsumi et al. | 364/424.05 |

FOREIGN PATENT DOCUMENTS 60-71315  4/1985 Japan .
63-46911  2/1988 Japan .

Primary Examiner—Kevin J. Teska
Assistant Examiner—Tan Q. Nguyen
Attorney, Agent, or Firm—Oblon, Spivak, McClelland, Maier & Neustadt

[57] ABSTRACT

A suspension control device for a vehicle includes: a vehicle speed detector for detecting a vehicle running speed; a spring or damping rate variation calculator for calculating variation of an apparent spring or damping rate of a suspension of a vehicle due to increase or reduction of the vehicle running speed on the basis of the detected vehicle running speed; and a spring or damping rate variable correction device for varying and correcting the spring or damping rate of the vehicle suspension to a predetermined value on the basis of the variation of the spring or damping rate. The spring or damping rate is determined by the variation of the apparent spring constant which is proportional to variation in aerodynamic force due to displacement of the attitude of the vehicle, the apparent damping rate variation which is proportional to variation in aerodynamic force due to displacement velocity of the attitude of the vehicle.

39 Claims, 19 Drawing Sheets

VEHICLE RUNNING SPEED U

PITCHING ANGULAR DISPLACEMENT θ (rad)

F I G. 5
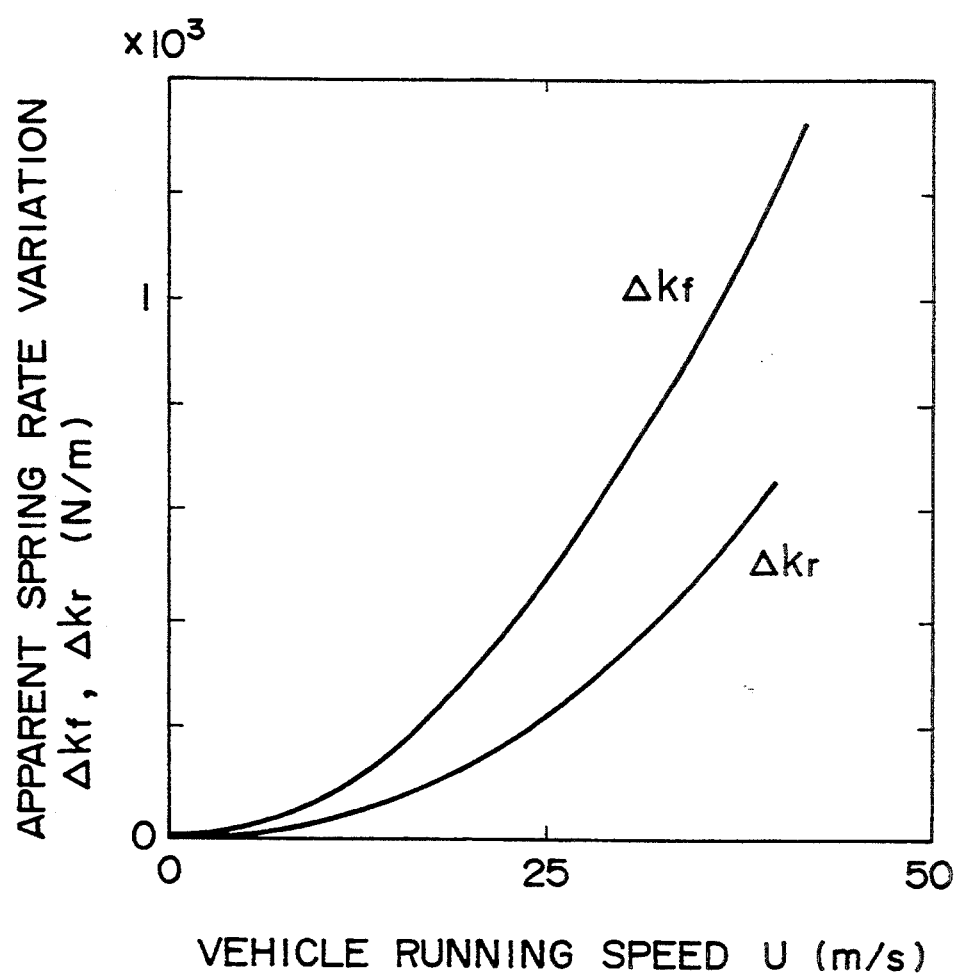

F I G. 14
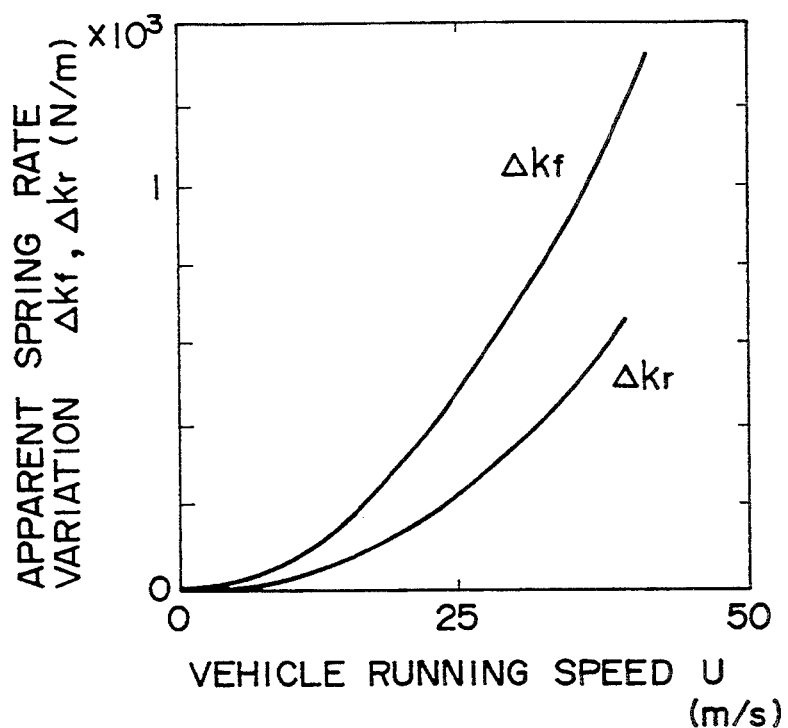
F I G. 15
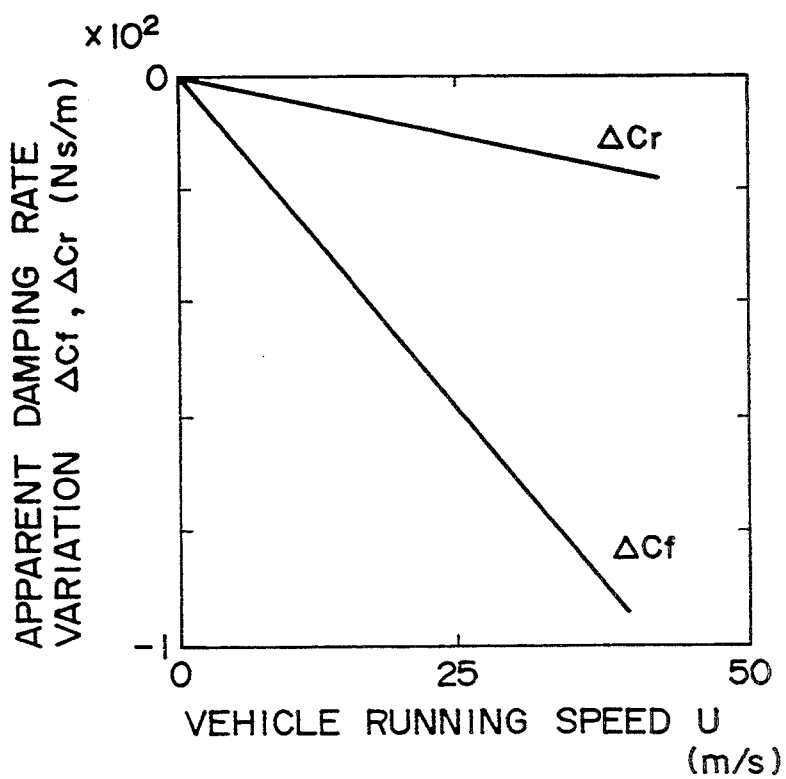

F I G. 18
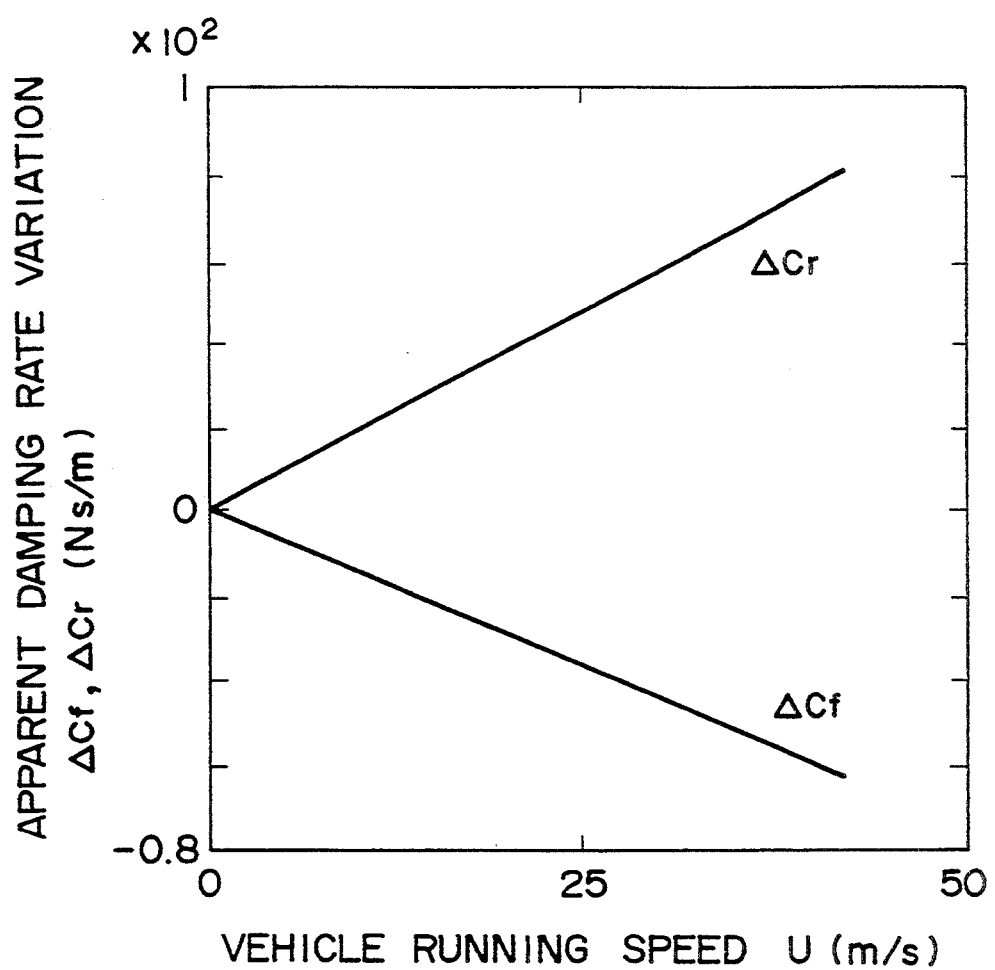

F I G. 21
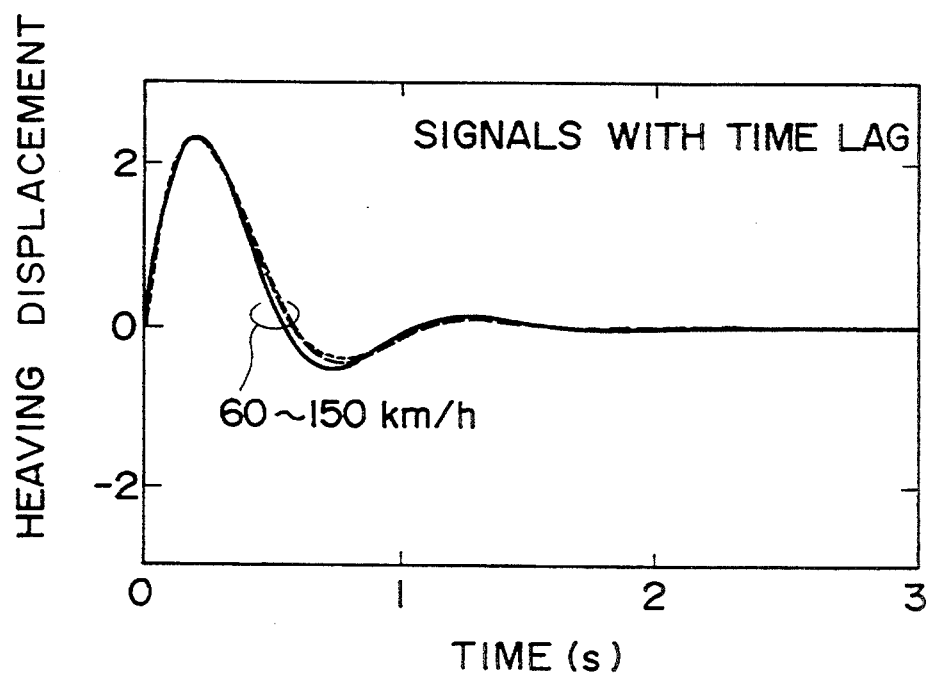

SUSPENSION CONTROL DEVICE FOR VEHICLE, TUNING METHOD FOR SPRING RATE OF SUSPENSION, AND TUNING METHOD FOR DAMPING RATE THEREOF

BACKGROUND OF THE INVENTION

1. Field of the Invention

This invention relates to a suspension control device for a vehicle, which provides a comfortable ride (drive feeling) and an excellent driving performance to a driver at any vehicle running speed from a low speed to a high speed.

2. Description of Related Art

There has been known a conventional technique in which the spring rate of a suspension for a vehicle is varied in accordance with a vehicle running speed (as disclosed in Japanese Laid-Open Patent Application No. 63-46911, for example). According to this technique, the spring rate is controlled to be reduced to a value lower than a normal value when the speed of the vehicle is increased and exceeds a predetermined value. In this technique, no consideration is paid to the effect of an force acting on the vehicle due to air flow which is caused during the vehicle running (this force is hereinafter referred to as aerodynamic force").

There has been also known another conventional technique in which the damping rate of a suspension of a vehicle is varied in accordance with a vehicle running speed (as disclosed in Japanese Laid-open Patent Application No. 60-71315, for example). According to this technique, the damping rate is adjusted to a value higher than a normal value at high speed, and to a value lower than the normal value at low speed. In this invention, no consideration is also paid to the effect of the aerodynamic force occurring during the vehicle running.

The effect of the aerodynamic force on the motion of a vehicle is intensified as the vehicle running speed is increased. Therefore, in order to improve drive feeling, responsivity and safety of the vehicle, this effect of the aerodynamic force must be introduced into a calculation of at least one of variation of the spring rate and variation of the damping rate.

The effect of the aerodynamic force on the motion of a vehicle has not been hitherto studied in detail. However, the inventors of this application have clarified the details of this aerodynamic effect through their experimental analysis based on the principle of aeroelasticity.

SUMMARY OF THE INVENTION

A first object of the present invention is to improve drive feeling (comfortable ride), responsivity and safety of the vehicle by controlling at least one of the spring rate and the damping rate of a suspension in consideration of the effect of an aerodynamic force on a vehicle motion.

A second object of the present invention is to improve a conventional experiential spring rate tuning method for a suspension which is based on a testing using an actual car and provide a novel spring rate tuning method for a suspension in which an aerodynamic force acting on a vehicle and the spring rate of a suspension serving as an elastic element are coupled with each other by applying the principle of aeroelasticity.

A third object of the present invention is to improve a conventional experiential damping rate tuning method for a suspension which is based on a testing using an actual car, and provide a novel damping rate tuning method for a suspension in which an aerodynamic force acting on a vehicle and the damping rate of a suspension serving as an elastic element are coupled with each other by applying aeroelasticity.

The inventors of this application and others have made experimental analysis for variation in aerodynamic characteristics with displacement of an attitude of a vehicle during its running, and FIGS. 2 and 3 show an up-and-down heaving motion and a pitching motion around center of gravity of a vehicle, respectively.

For the purpose of improving a drive feeling and a driving performance (controllability) of the vehicle in a vehicle-running state where the heaving motion and the pitching motion of the vehicle play a most important role in the whole motion of the vehicle, for example, in a straightly driving state of the vehicle, it is the most basic and effective manner to improve response characteristics to the heaving motion and the pitching motion. Further, in a case where improvement of the heaving motion and the pitching motion is targeted, it is sufficient to consider only a half vehicle model containing one front wheel and one rear wheel of the vehicle, and thus formulation and estimation on a vehicle motion are performed using this half vehicle model based on the heaving motion and the pitching motion.

FIGS. 2A, 2B and FIGS. 3A, 3B show variation of lift coefficient $C_L$ and pitching moment coefficient $C_{PM}$ with displacement of the height of a vehicle (heaving displacement) and displacement of a pitching angle, respectively.

As is apparent from FIGS. 2A, 2B and FIGS. 3A, 3B, the lift coefficient and the pitching moment coefficient are approximately proportional to the heaving displacement and the pitching angular displacement in a practical attitude-displacement region of the vehicle, and the gradients of these factors are linear.

According to the present invention, at least one of the spring rate and the damping rate of a suspension is adjusted to the optimum value by utilizing a characteristic that the aerodynamic characteristics as described above vary substantially in proportion to the heaving displacement and the pitching angular displacement in a practical attitude-displacement region of a vehicle.

That is, the fact that an aerodynamic force acts on a vehicle substantially in proportion to the heaving displacement and the pitching angular displacement shows that the aerodynamic force acting on the vehicle produces forces substantially in proportion to the displacement of the attitude of the vehicle and further it is also proportional to the displacement velocity of the vehicle attitude.

Specifically, the inventors of this application, have found out that a vehicle has a spring element and a damping element in its suspension, and the aerodynamic force apparently varies the spring rate and the damping rate of the suspension to affect the drive feeling and the driving performance (controllability) of the vehicle. Further, since the aerodynamic force acting on the vehicle is varied in accordance with the running speed and the attitude of the vehicle, various assumptions and conditions must be considered to apply aerodynamics to a motion model of a vehicle, and thus a model system becomes more complicated.

In order to overcome the above disadvantage, the inventors, have found that the aerodynamic force for the displacement of the vehicle attitude is represented by a constant aerodynamic derivative to set up a linearized equation of motion, and the transient response of the vehicle to an external disturbance can be treated in the same manner as a transient problem in the general spring and damper system.

According to the present invention, much attention is paid to the spring element of suspension elements of a vehicle, and the effect of the aerodynamic force is estimated as variation of the spring element, whereby the variation of the spring rate due to the effect of the aerodynamic force is compensated by a variable spring mechanism.

Further, according to the present invention, much attention is paid to the damping element of the suspension elements of the vehicle, and the effect of the aerodynamic force is estimated as variation of the damping element, whereby the variation of the damping rate due to the effect of the aerodynamic force is compensated by a variable damping mechanism.

In order to attain the above objects, a suspension control device for a vehicle according to a first aspect of this invention includes vehicle speed detecting means for detecting the speed of a vehicle, at least one of spring rate variation calculating means for calculating variation of an apparent spring rate of a suspension of a vehicle due to increase or reduction of the vehicle speed on the basis of the vehicle speed detected by the vehicle speed detecting means, and damping rate variation calculating means for calculating variation of an apparent damping rate of the suspension of the vehicle due to increase or reduction of the vehicle speed on the basis of the vehicle speed detected by the vehicle speed detecting means, and at least one of spring rate variable correction means for variably correcting the spring rate of the vehicle suspension to a predetermined value on the basis of the variation of the spring rate and damping rate variable correction means for variably correcting the damping rate of the vehicle suspension to a predetermined value on the variation of the damping rate.

According to the suspension control device of the first aspect of the present invention, the vehicle speed is detected by the vehicle speed detecting means, and at least one of the variation of the apparent spring rate of the vehicle suspension due to increase or reduction of the vehicle speed and the apparent damping rate variation of the vehicle suspension due to increase or reduction of the vehicle speed is calculated by at least one of the spring rate variation calculating means and the damping rate variation calculating means.

At least one of the spring rate and the damping rate of the suspension is corrected on the basis of at least one of the calculated apparent spring rate variation and the calculated apparent damping rate variation in at least one of the spring rate variable correction means and the damping rate variable correction means, whereby at least one of the spring rate and the damping rate which are suitable to improve the drive feeling, the responsibility and the safety of a vehicle is set.

According to the first aspect of the present invention, at least one of the spring rate and the damping rate of the suspension is corrected in accordance with the running speed of the vehicle while considering the effect of the aerodynamic force, so that a more comfortable ride can be give to a driver (the drive feeling can be improved) and the responsibility and safety of the vehicle can be improved.

In order to attain the above objects, a spring rate tuning method according to a second aspect of the present invention comprises the steps of: measuring at least one of aerodynamic derivatives in heaving and pitching directions which respectively represent a heaving effect and a pitching effect on a lift coefficient and a pitching moment coefficient of a vehicle, solving at least one of variation of an aerodynamic force in the heaving direction and variation of an aerodynamic force in the pitching direction in an equation of motion for the vehicle which takes the aerodynamic derivatives in the heaving and pitching directions into consideration, as a variation of the apparent spring rate of the suspension in an equation of motion for a vehicle which does not take the aerodynamic derivatives in the heaving and pitching directions into consideration, and setting the spring rate of the suspension on the basis of the variation of the apparent spring rate.

The action and effect of the spring rate tuning method for the suspension according to the second aspect of the present invention will be described.

According to the spring rate tuning method of the second aspect of the present invention, there is first measured at least one of the aerodynamic derivative in the heaving direction which represents the heaving effect on the lift coefficient and the pitching moment coefficient of the vehicle and the aerodynamic derivative in the pitching direction which represents the pitching effect on the lift coefficient and the pitching moment coefficient of the vehicle.

Next, the equation of motion for the vehicle in which at least one of the aerodynamic derivatives in the heaving and pitching directions is considered is set up to introduce at least one of the variation of the aerodynamic force in the heaving direction and the variation of the aerodynamic force in the pitching direction into the equation of motion for the vehicle.

Next, the equation of motion for the vehicle in which the aerodynamic derivatives in the heaving and pitching directions are not considered is set up, and then on the assumption that the equation of motion for the vehicle which does not take the aerodynamic derivatives into consideration are equivalent to the equation of motion for the vehicle which takes the aerodynamic derivatives into consideration, at least one of the variation of the aerodynamic force in the heaving direction and the variation of the aerodynamic force in the pitching direction in the equation of motion for the vehicle which takes the aerodynamic derivatives into consideration is solved as a variation of the apparent spring rate of the suspension in the equation of motion for the vehicle which does not take the aerodynamic derivatives into consideration, whereby the variation of the aerodynamic derivative can be estimated to be variation of the apparent spring rate of the suspension.

Further, by setting the spring rate of the suspension on the basis of the apparent spring rate variation of the suspension, it becomes possible to set the spring rate of the suspension in consideration of the effect of the aerodynamic force.

Using the spring rate thus set, the spring rate of the suspension is corrected in accordance with the running speed of the vehicle while considering the effect of the aerodynamic force, so that a more comfortable ride can be given to a driver and responsibility and safety of the vehicle can be improved.

In order to attain the above objects, a damping rate tuning method according to a third aspect of the present invention comprises the steps of: measuring at least one of aerodynamic derivatives in heaving and pitching directions which respectively represent a heaving effect and a pitching effect on a lift coefficient and a pitching moment coefficient of a vehicle, solving at least one of variation of an aerodynamic force in the heaving direction and variation of an aerodynamic force in the pitching direction in an equation of motion for the vehicle which takes the aerodynamic derivatives in the heaving and pitching directions into consideration, as a variation of an apparent damping rate of the suspension in an equation of motion for a vehicle which does not take the aerodynamic derivatives in the heaving and pitching directions into consideration, and setting the damping rate of the suspension on the basis of the apparent damping rate variation.

The action and effect of the damping rate tuning method for the suspension according to the third aspect of the present invention will be described.

According to the damping rate tuning method of the third aspect of the present invention, there is first measured at least one of the aerodynamic derivative in the heaving direction which represents the heaving effect on the lift coefficient and the pitching moment coefficient of the vehicle and the aerodynamic derivative in the pitching direction which represents the pitching effect on the lift coefficient and the pitching moment coefficient of the vehicle.

Next, the equation of motion for the vehicle in which at least one of the aerodynamic derivatives in the heaving and pitching directions is considered is set up to introduce at least one of the variation of the aerodynamic force in the heaving direction and the variation of the aerodynamic force in the pitching direction into the equation of motion for the vehicle.

Next, the equation of motion for the vehicle in which the aerodynamic derivatives in the heaving and pitching directions are not considered is set up, and then on the assumption that the equation of motion for the vehicle which does not take the aerodynamic derivatives into consideration are equivalent to the equation of motion for the vehicle which takes the aerodynamic derivatives into consideration, at least one of the variation of the aerodynamic force in the heaving direction and the variation of the aerodynamic force in the pitching direction in the equation of motion for the vehicle which takes the aerodynamic derivatives into consideration is solved as a variation of the apparent damping rate of the suspension in the equation of motion for the vehicle which does not take the aerodynamic derivatives into consideration, whereby the variation of the aerodynamic derivative can be estimated to be variation of the apparent damping rate of the suspension.

Further, by setting the damping rate of the suspension on the basis of the apparent damping rate variation of the suspension, it becomes possible to set the damping rate of the suspension in consideration of the effect of the aerodynamic force.

By using the damping rate thus set, the damping rate of the suspension is corrected in accordance with the running speed of the vehicle while considering the effect of the aerodynamic force, so that a more comfortable ride can be given to a driver and responsibility and safety of the vehicle can be improved.

BRIEF DESCRIPTION OF THE DRAWINGS

FIG. 5 is a graph showing relationship between a spring rate variation and a vehicle running speed of the first embodiment;

FIG. 14 is a graph showing relationship between a spring rate variation and a vehicle running speed of the fourth embodiment;

FIG. 15 is a graph showing relationship between a damping rate variation and a vehicle running speed of the fourth embodiment;

FIG. 18 is a graph showing a damping rate variation and a vehicle running speed of the fifth embodiment;

FIG. 21 is a graph showing a response characteristic of a vehicle in a sixth embodiment;

DETAILED DESCRIPTION OF PREFERRED EMBODIMENTS

Preferred embodiments according to the present invention will be described hereunder with reference to the accompanying drawings.

(First Embodiment)

In a first embodiment, a suspension control device for a vehicle according to this invention is applied to a vehicle in which the spring rate of a suspension can be controlled to a variable value.

Figure 4:
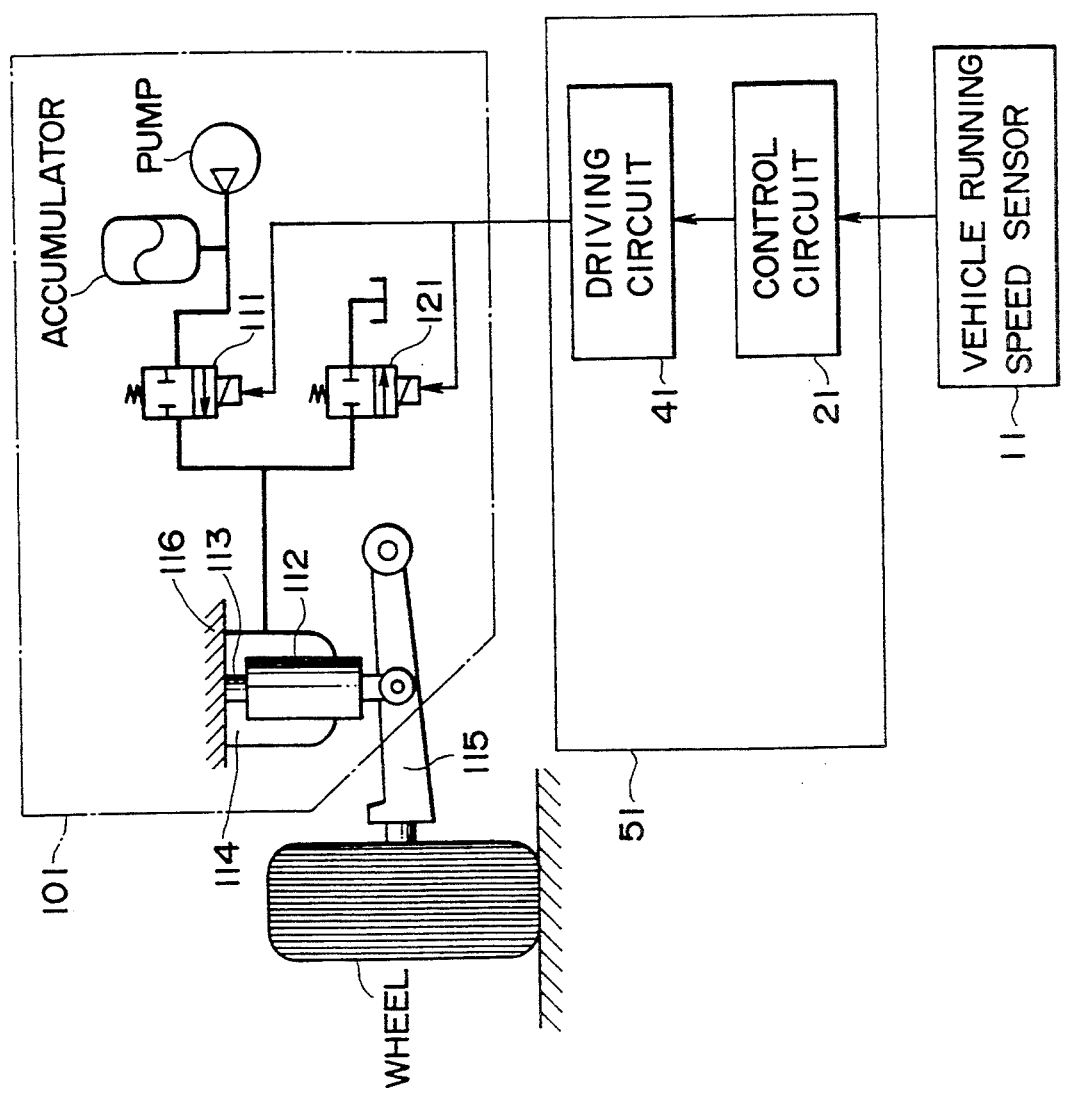
FIG. 4 shows the basic construction of first and second embodiments.

The suspension control device of the first embodiment includes a vehicle running speed sensor 11, a control circuit 21, a driving circuit 41 and an air spring mechanism 101 which is a control target, as shown in FIG. 4.

The vehicle running speed sensor 11 comprises a speedometer, or an airspeed sensor or the like, and serves to output an electrical signal corresponding to a detected speed as a vehicle speed signal U. The control circuit 21 serves to calculate an apparently-varying spring rate value on the basis of the vehicle speed signal U, and output the calculated value as an apparent spring rate variation.

The calculation of the apparent spring rate variation in the control circuit 21 will be hereunder described with reference to FIGS. 2A, 2B, 3A and 3B.

As apparent from FIGS. 2A, 2B, 3A and 3B, the lift coefficient and the pitching moment coefficient vary substantially in proportion to a heaving displacement and a pitching angular displacement in a practical displacement region of the attitude of a vehicle having practical height, and the gradients of these coefficients are linear.

That is, the action of the aerodynamic force is substantially proportional to the heaving displacement and the pitching angular displacement, and thus it is expected to be equivalent to the function of a spring which produces a force proportional to a stroke amount of a suspension.

On the basis of this equivalence, the effect of the aerodynamic force on variation of the attitude of a vehicle can be simplified to a fact that variation rate of each of the lift coefficient and the pitching moment coefficient to the heaving displacement and the pitching angular displacement is represented by a constant value, and the variation rate can be introduced as an aerodynamic derivative into an equation of motion for the vehicle. The equation of motion for a vehicle which takes the aerodynamic derivative into consideration is as follows. In the following description, a time-differential value of a variable x is represented by x'.

$$F_L = (\tfrac{1}{2})\rho U^2 A(C_{LZ}z + C_{LTH}\theta) \quad (1)$$

$$F_{PM} = (\tfrac{1}{2})\rho U^2 Aa(C_{PMZ}z + C_{PMTH}\theta) \quad (2)$$

$$Mw' = -k_f x_f - c_f x_f' - k_r x_r - c_r x_r' + F_L \quad (3)$$

$$Ip' = a_f(k_f x_f - c_f x_f') = a_r(k_r x_r - c_r x_r') + F_{PM} \quad (4)$$

Here, $a_f, a_r$: length from center of gravity of a vehicle to a front wheel position and a rear wheel position [m]
a: wheel base ($=a_f+a_r$) [m]
A: frontal projected area of a vehicle [m²]
$c_f, c_r$: damping coefficients of front and rear suspensions [Ns/m]
$C_{LZ}$: aerodynamic derivative in heaving direction of lift coefficient ($=\partial C_L/\partial z$) [1/m]
$C_{LTH}$: aerodynamic derivative in pitching direction of lift coefficient ($=\partial C_L/\partial\theta$) [1/rad]
$C_{PMZ}$: aerodynamic derivative in heaving direction of pitching moment coefficient ($=\partial C_{PM}/\partial z$) [1/m]
$C_{PMTH}$: aerodynamic derivative in pitching direction of pitching moment coefficient ($=\partial C_{PM}/\partial\theta$) [1/rad]
$F_L, F_{PM}$: external forces in heaving and pitching motional directions [N], [N−M]
I: inertial moment around pitching axis [kgm²]
$k_f, k_r$: spring rates of front wheel suspension and rear wheel suspension [N/m]

M: sprung mass of a vehicle [kg]
$\theta$: pitching angular displacement [rad]
P: angular velocity of pitching motion ($=\theta'$) [rad/s]
R: length from center of gravity of a vehicle to nose tip of vehicle body [m]
U: vehicle running speed [m/s]
z: heaving displacement of center of gravity of a vehicle [m]
$z_f, z_r$: heaving displacement of centers of front and rear wheels [m]
w: velocity of heaving motion ($=z'$) [m/s]
$x_f, x_r$: strokes of front and rear suspensions [m]
$\rho$: air density [kg/m³]

The equation (1) represents an external force in the direction of the heaving motion, and the equation (2) represents an external force in the direction of the pitching motion. From these equations (1) and (2), it is apparent that the external forces which are proportional to displacements z and $\theta$ occur in the heaving and pitching directions. Further, these external forces are also proportional to the second power of the vehicle running speed and the aerodynamic derivatives $C_{LZ}$, $C_{LTH}$, $C_{PMZ}$ and $C_{PMTH}$ which are necessarily determined in accordance with the configuration of the vehicle.

The aerodynamic derivatives are measured in accordance with the following procedure.

Figure 1:
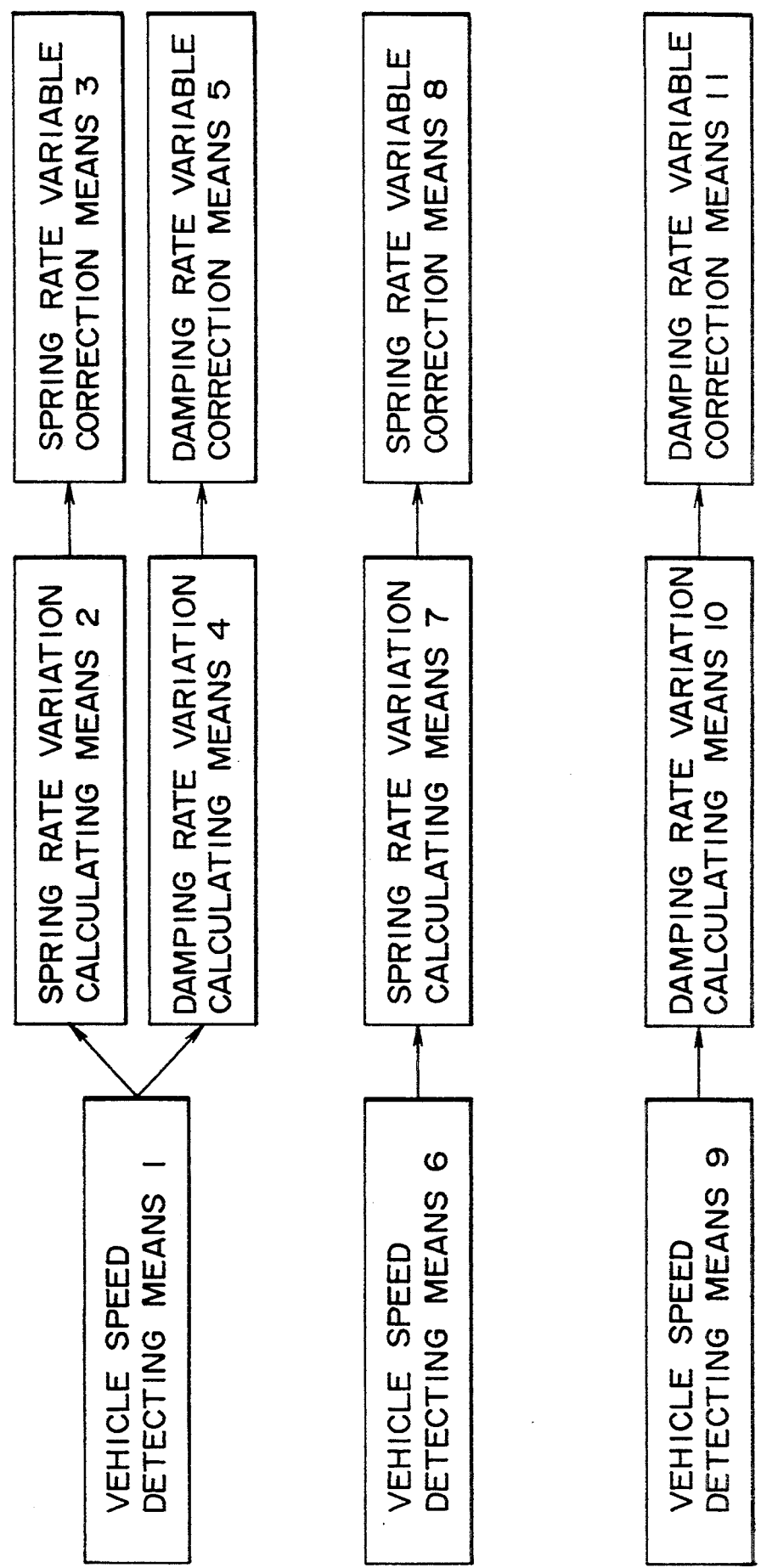
FIG. 1 is a block diagram showing a basic construction of this invention.
Figure 2A:
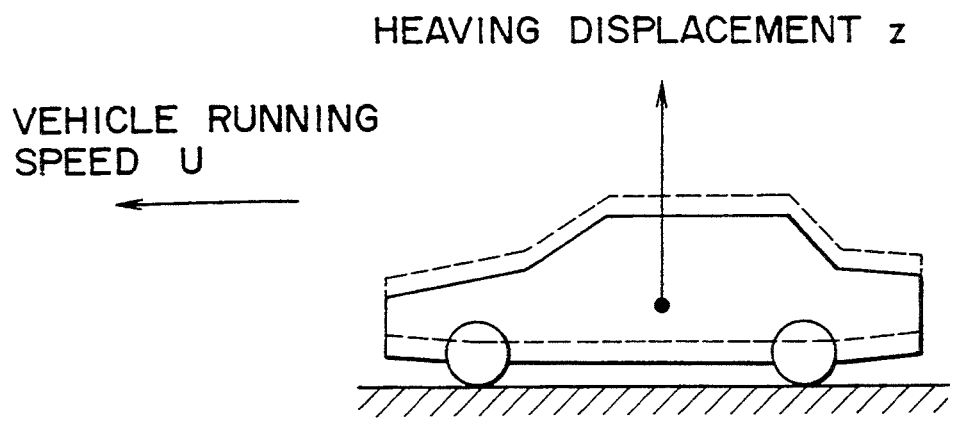
FIG. 2A is a diagram illustrating heaving displacement.
Figure 2B:
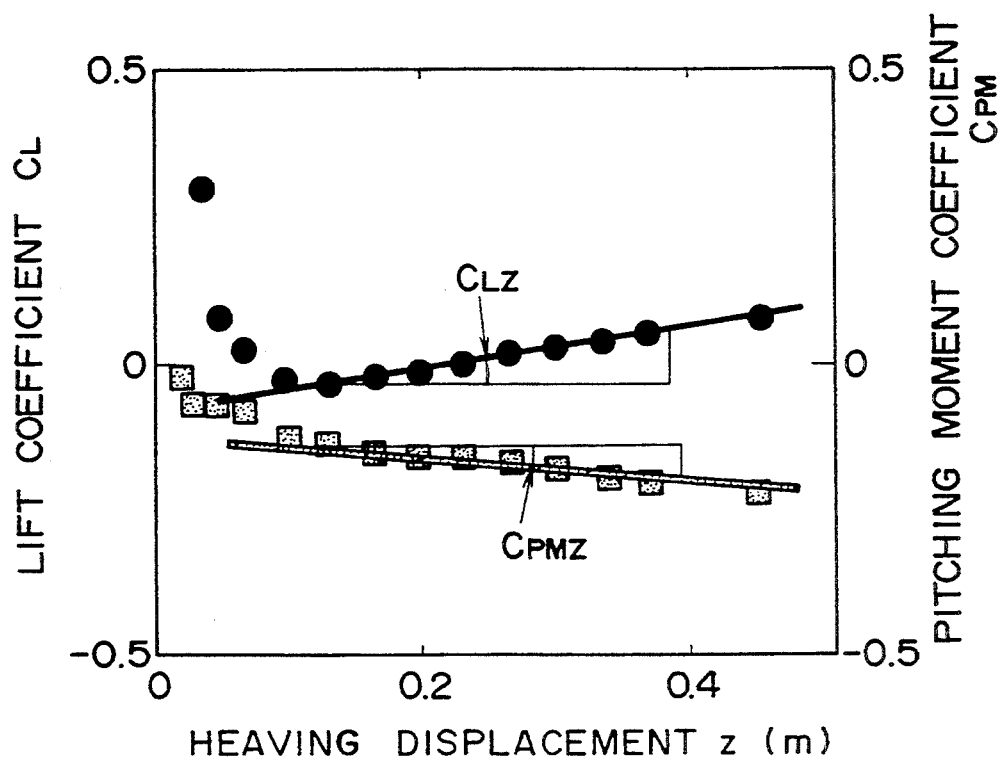
FIG. 2B is a graph showing variation of an aerodynamic derivative in a heaving direction.
Figure 3A:
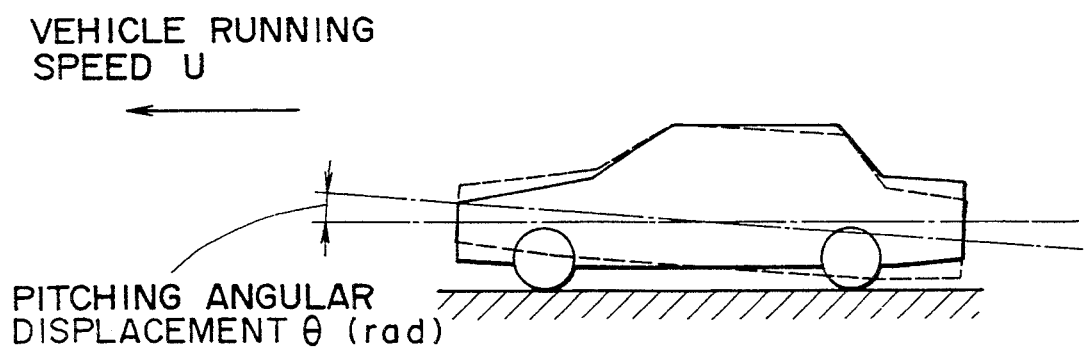
FIGS. 3A is a diagram illustrating pitching angular displacement.
Figure 3B:
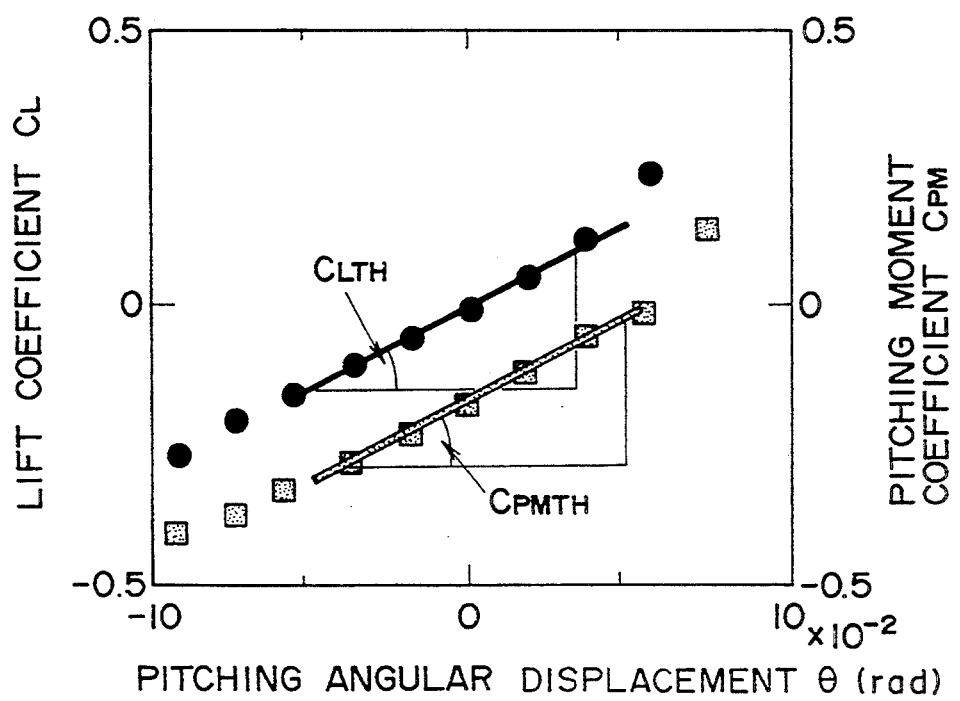
FIG. 3B is a graph showing variation of an aerodynamic derivative in a pitching direction.

A test car or a model is carried in or mounted in a wind tunnel, and the attitude of the test car is displaced in a heaving direction and a pitching direction by predetermined amounts with respect to a reference attitude in which a car having no people and no cargo is disposed horizontally (FIGS. 2A and 3A). In the case of an actual car, the attitude of the car is displaced relatively to the reference attitude by loading weights into the interior, the bonnet and the engine room of the car, that is, into places which are not affected by air flow. In the case of a model, the attitude of the model is displaced by a predetermined amount by altering the mount position of wheels or adjusting the length of wires or the set angle of stings when the model is secured with the wires or stings. The aerodynamic characteristic values ($C_L$ and $C_{PM}$) in the reference attitude and the predetermined displaced attitude are measured, and the relationship between the displacement and the measured aerodynamic characteristic values is shown (FIGS. 2B and 3B). The relationship between the displacement and each of the aerodynamic characteristic values is linear in a displacement range for a normal running, and thus the aerodynamic derivative which is defined by the slope of this line is determined.

The equations of motion represented by the equations (1) to (4) are transformed to equations of state, and the heaving motion and the pitching motion are represented as follows using the equations of state.

$$\begin{aligned}Mw' = & (-a_fk_f + a_rk_r + qAC_{LTH})\theta + \\ & (-a_fc_f + a_rc_r)p + \\ & (-k_f - k_r + qAC_{LZ})Z + \\ & (-c_f - c_r)w + k_fz_f + c_fw_f + k_rz_r + c_rw_r)\end{aligned} \quad (5)$$

$$\begin{aligned}Ip' = & (-a_f^2k_f - a_r^2k_r + qAaC_{PMTH})\theta + \\ & (-a_f^2c_f - a_r^2c_r)p + \\ & (-a_fk_f + a_rk_r + qAaC_{PMZ})Z + \\ & (-a_fc_f + a_rc_r)w + (a_fk_f)Z_f + \\ & (a_fc_f)w_f - a_rk_rZ_r - a_rc_rw_r\end{aligned} \quad (6)$$

Here, $$W_f = Z_f', W_r = Z_r', q = (1/2)\rho U^2 \quad (7)$$

From the first and third terms containing the aerodynamic derivatives at the right sides of the equations (5) and (6), that is, the following equations, it is shown that the spring rate apparently varies due to the aerodynamic force.

$$A_1 = -a_f^2 k_f - a_r^2 k_r + qAaC_{PMTH} \tag{8}$$

$$A_2 = -a_f k_f - a_r k_r + qAaC_{PMZ} \tag{9}$$

$$A_3 = -a_f k_f - a_r k_r + qAC_{LTH} \tag{10}$$

$$A_4 = -k_f - k_r + qAC_{LZ} \tag{11}$$

The values of $A_1$ to $A_4$ based on the vehicle running speed are calculated using the equations (8) to (11) in the control circuit 21 according to this embodiment to calculate an apparent spring rate which satisfies such a condition that the variation of a spring rate of a suspension which is represented with some terms (containing the coefficients $k_f$, $k_r$) of the equations $A_1$ to $A_4$ thus calculated (calculation result) is apparently equivalent to the variation of a spring rate of a suspension obtained by an equation of motion which pays no consideration to the aerodynamic derivatives, that is, an equation of motion in which the vehicle running speed U is set to zero, That is, when representing apparent spring rates of front and rear suspensions of the vehicle in a running state thereof by $k_f^*$ and $k_r^*$, $k_f^*$ and $k_r^*$ satisfy the following equation (12).

$$\begin{pmatrix} -a_f & -a_r^2 \\ -a_f & +a_r^2 \\ -a_f & +a_r^2 \\ -1 & -1 \end{pmatrix} \begin{pmatrix} k_f^* \\ k_r^* \end{pmatrix} = \begin{pmatrix} A_1 \\ A_2 \\ A_3 \\ A_4 \end{pmatrix} \tag{12}$$

The least square solution of the above equation provides the apparent spring rates of the front and rear wheel suspensions of the vehicle, $k_f^*$ and $k_r^*$, and the difference between the apparent spring rate and the actual spring rate $k_f$, $k_r$, that is, the apparent spring-rate variations $\Delta k_f = k_f - k_f^*$, and $\Delta k_r = k_r - k_r^*$ are obtained.

FIG. 4 shows an example of the control circuit 21 according to this embodiment in which these values are sequentially calculated using a microcomputer 51 for a suspension. Alternately, the following manner may be adopted. That is, since the spring rate variation is represented as a function of the vehicle running speed as described above, correction values for representative vehicle running speeds are beforehand stored in a map format, and each of the correction values is stepwise output for any vehicle running speed.

The driving circuit 41 serves to vary and correct the spring rate of the suspension in accordance with the vehicle running speed on the basis of the output signal of the control circuit 21, and control the air spring mechanism 101.

The air spring mechanism 101 has been hitherto known as an air spring type suspension device, and comprises a cylinder member 112 whose lower end portion is secured to an arm 115 serving as a wheel shaft member, a piston rod 113 whose top end portion is secured to a vehicle body 116, and an air chamber 114 provided between the cylinder member 112 and the piston rod 113. The up-and-down motion of the vehicle body is elastically supported by the pressure of air which is sealingly filled in the air chamber 114. The spring rate of the suspension can be varied by supplying air to the air chamber 114 or discharging the air from the air chamber 114. The air supply and discharge operation into and from the air chamber 114 is controlled by solenoid valves 111 and 121, and the air amount to be supplied to or discharged from the air chamber 114 is varied and corrected on the basis of the output signal of the driving circuit 41.

FIG. 5 is a graph showing the apparent spring rate variation calculated in the control circuit 21. In this embodiment, the spring rate is variably controlled (adjusted) on the basis of a relational expression between the apparent spring rate variation and the vehicle running speed as represented by the following equations:

$$k_f = a_f U^2 \tag{13}$$

$$k_r = a_r U^2 \tag{14}$$

In the above equations (13) and (14), $a_f$ and $a_r$ are constants which are determined on the basis of the item of a vehicle. In this embodiment, the following values are used as an example for a normal-size passenger car:

$$a_f = 0.79, \ a_r = 0.44 [N.S^2/m^3]$$

Further, for a lighter-weight compact passenger car, the following values are used as an example.

$$a_f = 0.74, \ a_r = 0.36 [N.S^2/m^3]$$

As described above, the spring rate of the suspension which would apparently vary in accordance with increase or reduction of the vehicle running speed can be controlled not to be dependent on any vehicle running speed from a lower speed to a higher speed by varying and correcting the spring rate of the suspension so as to offset the apparent spring rate variation, thereby achieving vehicle characteristics having stable drive feeling and driving performance.

Figure 6A:
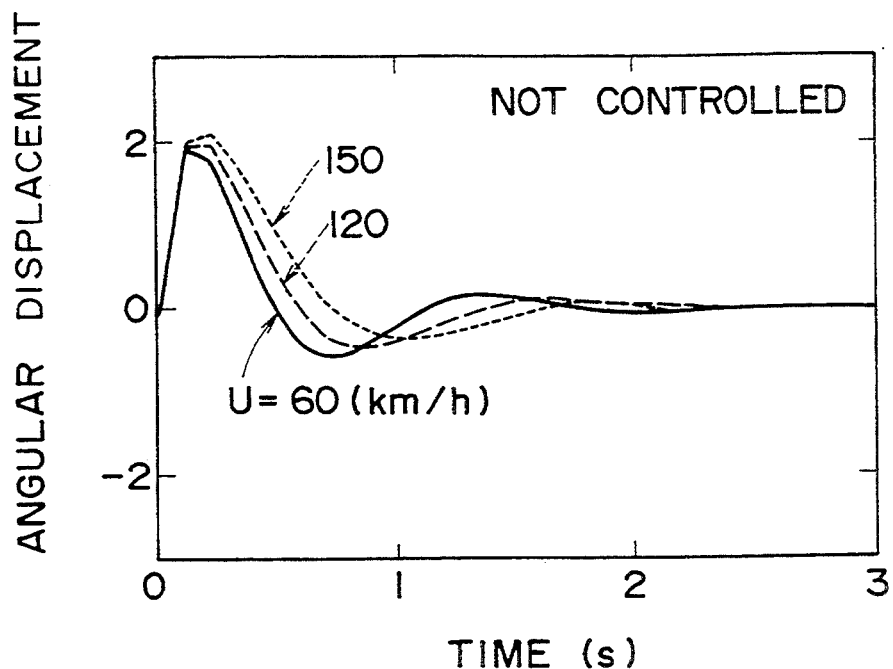
FIGS. 6A and 6B are graphs showing response characteristics of a vehicle in the prior art.
Figure 6B:
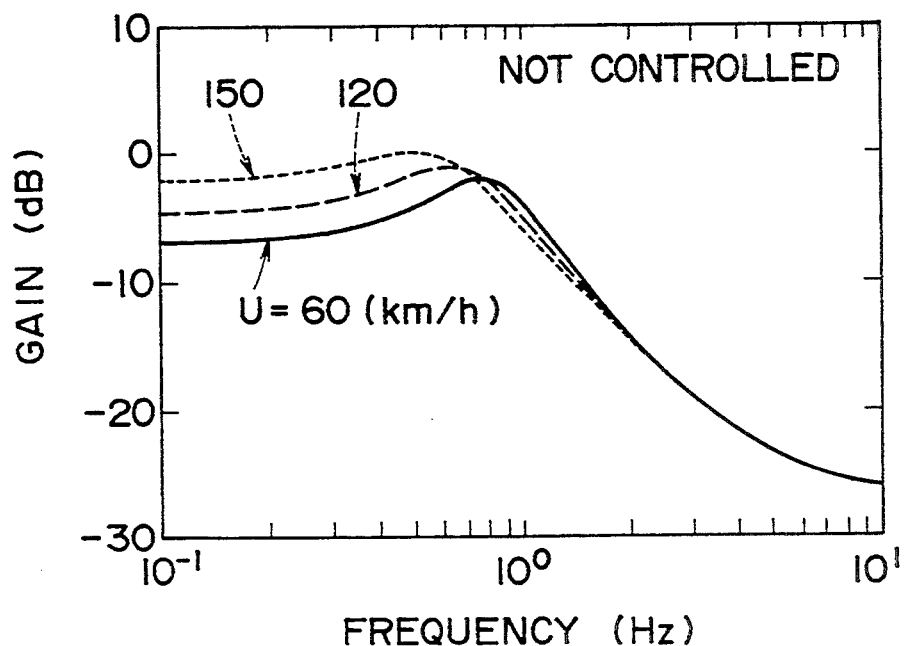
Figure 7A:
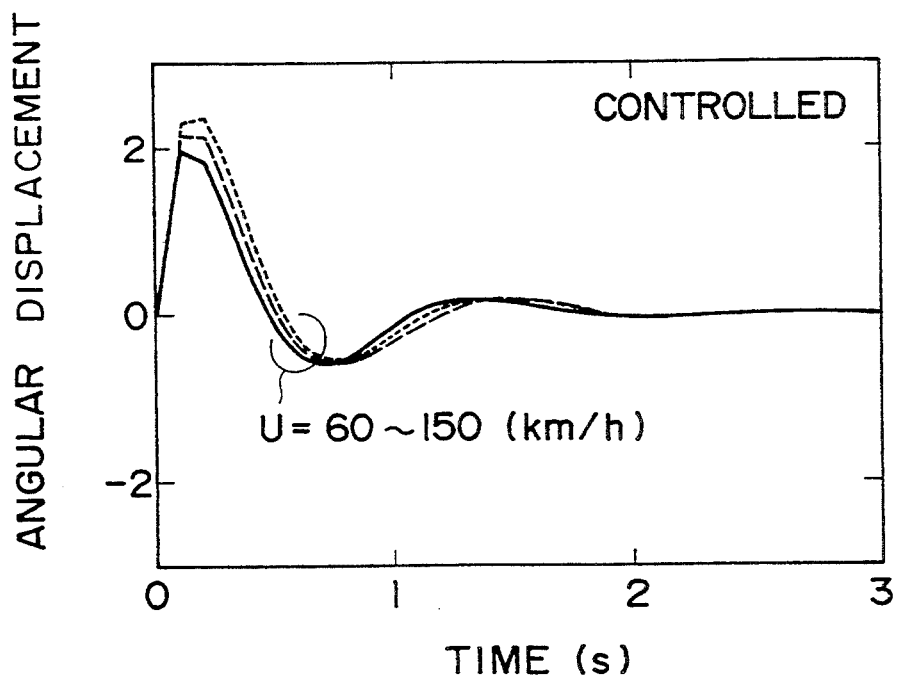
FIGS. 7A and 7B show graphs showing response characteristics of a vehicle in the first embodiment.
Figure 7B:
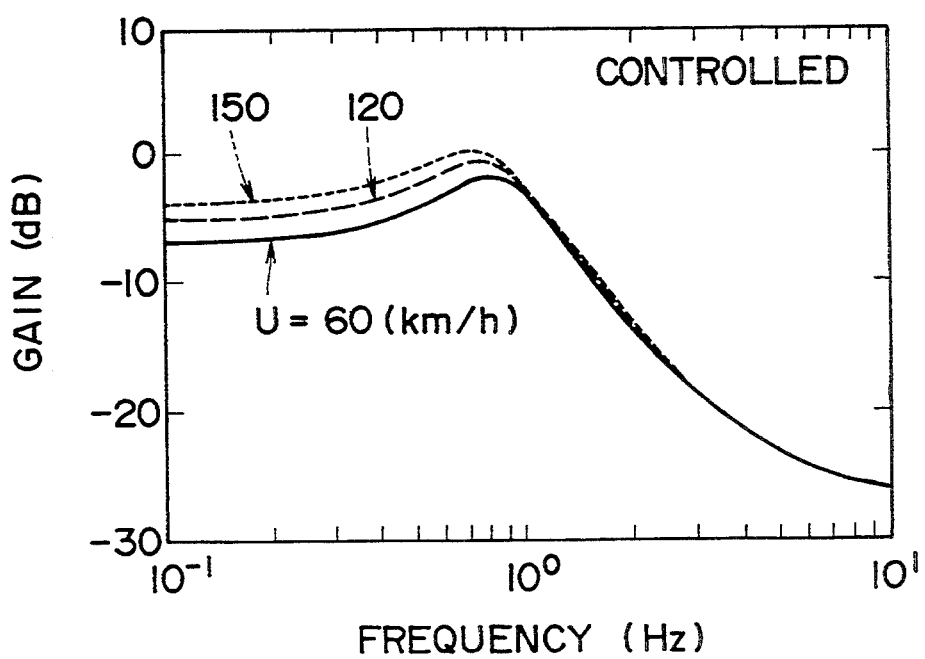

FIGS. 6A and 6B show response characteristics of a vehicle in the prior art, and FIGS. 7A and 7B show response characteristics of a vehicle in the suspension control device according to this invention.

FIGS. 6A and 7A show an impulse response characteristic which represents displacement of the attitude of a vehicle with time lapse when the vehicle passes over a fine step when it moves straightly, and FIGS. 6B and 7B show a transient response of the displacement of the vehicle attitude in a frequency band at the time when the vehicle passes over the fine step.

For the prior art having no control operation, as shown in FIG. 6B, a resonance frequency of a transient response waveform is more reduced as the vehicle running speed is increased. This means that when the vehicle suffers an external disturbance during its running, the angular displacement is more moderate as the running speed is higher, and the transient response of the motion tend to be deteriorated as shown in FIG. 6A.

On the other hand, for this embodiment having a control operation, the reducing trend of the resonance frequency is improved as shown in FIG. 7B, and the waveform representing the transient response with time lapse is substantially unvaried even when the vehicle running speed is varied. That is, it is apparent from FIG. 7A that even when the vehicle moves at high speed, the same degree of transient response to the external force as that when it moves at low speed can be obtained.

(Second Embodiment)

In a second embodiment, the calculation manner of the suspension control circuit 21 is altered in the suspension control device for the vehicle according to the first embodiment described above.

The second embodiment is characterized in that the spring rate variation is calculated in consideration of only the variation of the aerodynamic derivative in the pitching direction because the variation of the aerodynamic derivative in the heaving direction is smaller than that in the pitching direction and thus it is negligible. With respect to the aerodynamic characteristics and the vehicle model, the same description as the first embodiment can be made, and in the equations (1) to (11), the aerodynamic derivatives in the heaving direction $C_{LZ}$ and $C_{PMZ}$ may be set to zero.

In this case, when representing the apparent spring rates of the front and rear wheel suspensions of a running vehicle by $k_f^*$ and $k_r^*$, $k_f^*$ and $k_r^*$ satisfy the following equation (15):

$$\begin{pmatrix} -a_f^2 & -a_r^2 \\ -a_f & +a_r \end{pmatrix} \begin{pmatrix} k_f^* \\ k_r^* \end{pmatrix} = \begin{pmatrix} A_1 \\ A_2 \end{pmatrix} \quad (15)$$

A solution of the above equation provides the apparent spring rate of the front and rear wheel suspensions of the vehicle, $k_f^*$ and $k_r^*$, and the difference between the apparent spring rate and the actual spring rate $k_f$, $k_r$, that is, the apparent spring rate variations $\Delta k_f = k_f - k_f^*$, and $\Delta k_r - k_r^*$ are obtained.

Figure 8:
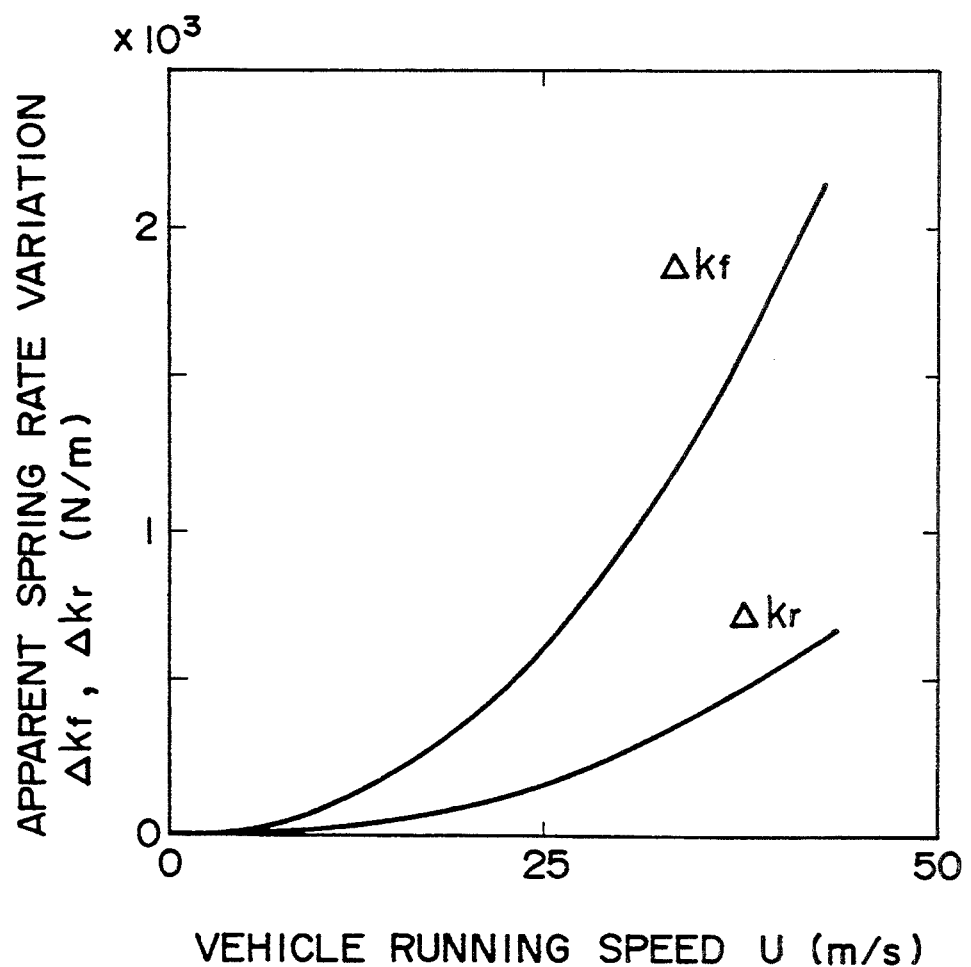
FIG. 8 is a graph showing relationship between a spring rate variation and a vehicle running speed of the second embodiment.

FIG. 8 is a graph showing the apparent spring rate variation calculated in the control circuit 21. In this embodiment, the spring rate is variably controlled (adjusted) on the basis of a relational expression between the apparent spring rate variation and the vehicle running speed as represented by the following equations:

$$k_f = \alpha_f U^2 \quad (16)$$

$$k_r = \alpha_r U^2 \quad (17)$$

In the above equations (16) and (17), $\alpha_f$ and $\alpha_r$ are constants which are determined on the basis of the item of a vehicle. In this embodiment, the following values are used as an example for a normal-size passenger car:

$\alpha_f = 1.2$, and $\alpha_r = 0.35 [N.S^2/m^3]$

Further, for a lighter-weight compact passenger car, the following values are used as an example.

$\alpha_f = 1.3$, and $\alpha_r = 0.37 [N.S^2/m^3]$

As described above, the spring rate of the suspension which would apparently vary in accordance with increase or reduction of the vehicle running speed can be controlled not to be dependent on any vehicle running speed from a lower speed to a higher speed by varying and correcting the spring rate of the suspension so as to offset the apparent spring-rate variation, thereby achieving vehicle characteristics having stable drive feeling and driving performance.

Figure 9A:
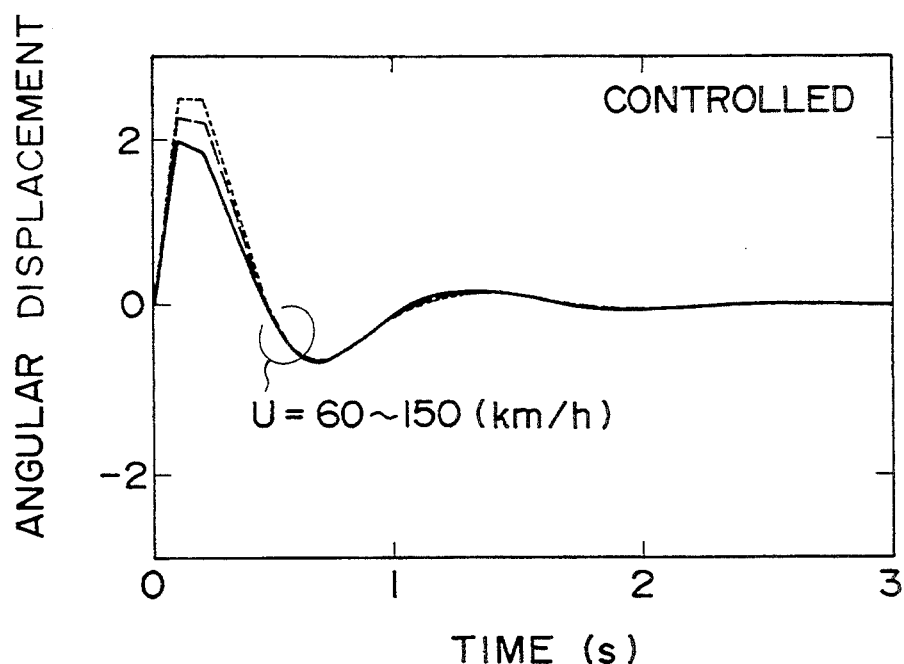
FIGS. 9A and 9B are graphs showing response characteristics of a vehicle in the second embodiment.
Figure 9B:
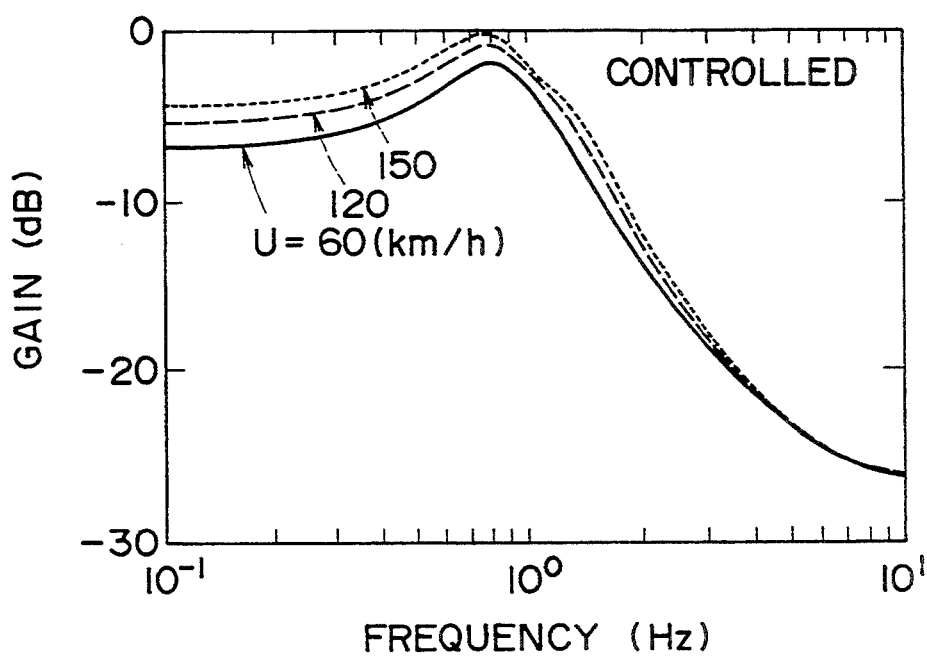

An effect of the suspension control device according to this embodiment is shown in FIGS. 9A and 9B, as compared to FIGS. 6A and 6B showing the response characteristics of a vehicle in the prior art. FIGS. 9A and 9B show response characteristics of a vehicle in the suspension control device according to this invention.

FIGS. 6A and 9A show an impulse response characteristic which represents displacement of the attitude of a vehicle with time lapse when the vehicle passes over a fine step when it moves straightly, and FIGS. 6B and 9B show a transient response of the displacement of the vehicle attitude in a frequency band at the time when the vehicle passes over the fine step.

For the prior art having no control operation, as shown in FIG. 6B, a resonance frequency of a transient response waveform is more reduced as the vehicle running speed is increased. This means that when the vehicle suffers an external disturbance during its running, the angular displacement is more moderate as the running speed is higher, and the transient response of the motion tend to be deteriorated as shown in FIG. 6A.

On the other hand, for this embodiment having a control operation, the reducing trend of the resonance frequency is improved as shown in FIG. 9B, and the waveform representing the transient response with time lapse is substantially unvaried even when the vehicle running speed is varied. That is, it is apparent from FIG. 9A that even when the vehicle moves at high speed, the same degree of transient response to the external force as that when it moves at low speed can be obtained.

As described above, the same effect as the first embodiment can be obtained in the second embodiment.

(Third embodiment)

In a third embodiment, the calculation manner of the suspension control circuit 21 is altered in the suspension control device for a vehicle according to the first embodiment, and the suspension control device is applied to a vehicle in which a damping rate of the suspension can be variably controlled.

Figure 10:
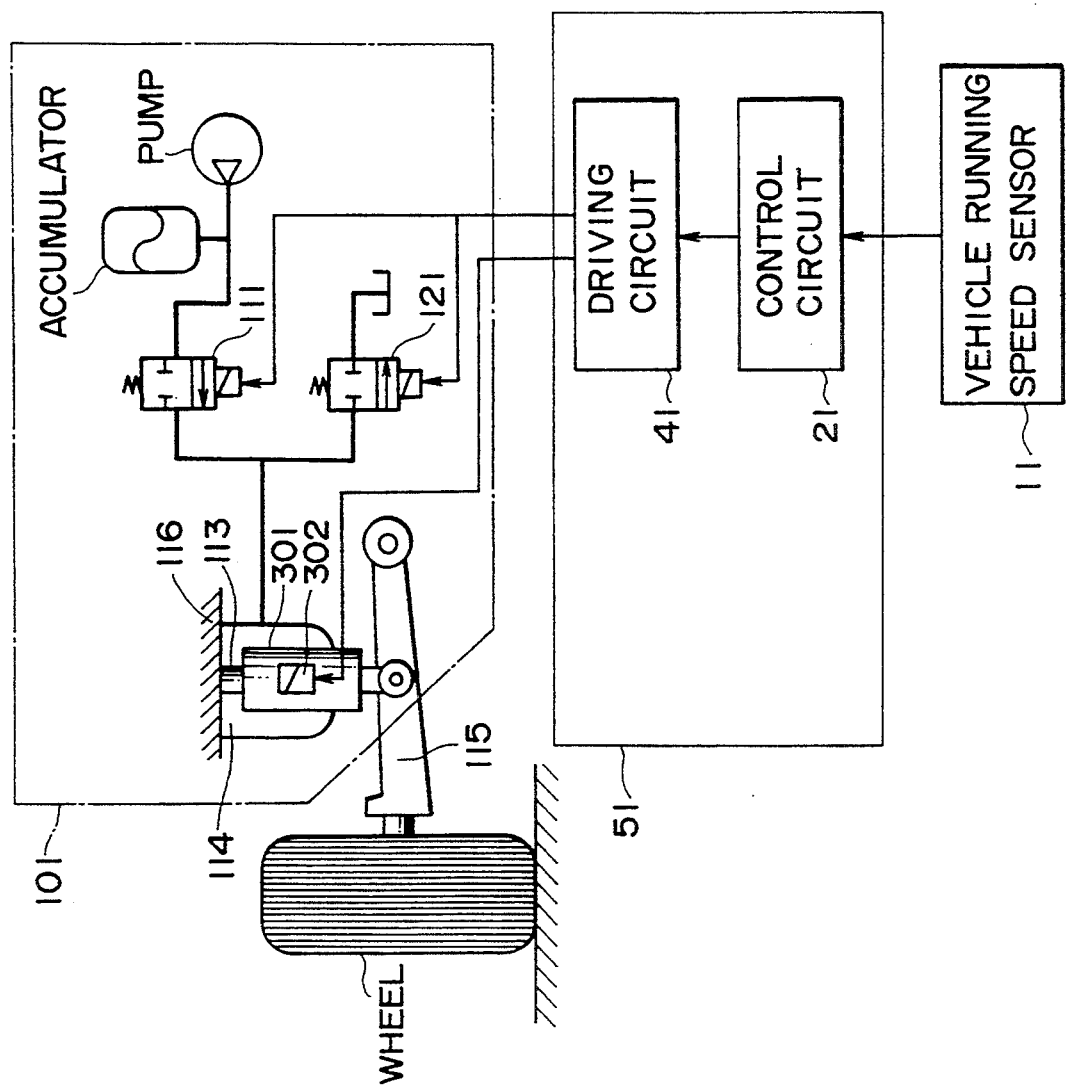
FIG. 10 shows the basic construction of third, fourth and fifth embodiments.

The suspension control device of the third embodiment comprises a vehicle running speed sensor 11, a control circuit 21, a driving circuit 41 and a variable damper mechanism 302 serving as a control target as shown in FIG. 10.

The vehicle running speed sensor 11 comprises a speedometer, or an airspeed sensor or the like, and serves to output an electrical signal corresponding to a detected speed as a vehicle speed signal U. The control circuit 21 serves to calculate an apparently-varying damping rate value on the basis of the vehicle speed signal U, and output the calculated value as an apparent damping rate variation.

In FIG. 10, the air spring mechanism 101 is shown as a spring element of the suspension, however, no air spring variable mechanism is provided to the third embodiment because it is unnecessary to control the spring element in the third embodiment. In place of the air spring, a coil spring or the like may be provided in the third embodiment.

The calculation of the apparent damping rate variation in the control circuit 21 will be hereunder described with reference to FIGS. 2A, 2B and FIGS. 3A, 3B.

As apparent from FIGS. 2A, 2B and FIGS. 3A, 3B, the lift coefficient and the pitching moment coefficient vary substantially in proportion to a heaving displacement and a pitching angular displacement in a practical displacement region of the attitude of a vehicle having practical height, and the gradients of these coefficients are linear.

Strictly considering the displacement of the attitude of a vehicle when the vehicle is moved, the nose tip of the vehicle is moved at a vehicle running speed, and also moved at a heaving speed and a pitching speed (corresponding to the product of a pitching angular velocity and the length from the position of the center of gravity of the vehicle to the tip of the vehicle) in the vertical direction of the vehicle. That is, the tip of the vehicle is moved in the direction of a composite vector of the above three speeds relatively to the air. This attitude displacement is independent of the motion represented by the pitching angular displacement around the center of gravity of the vehicle as described in the first embodiment, and thus the pitching angular displacement must be corrected in consideration of the attitude displacement. The corrected pitching angular displacement is represented as follows:

$$\theta = \theta - (z' + R\theta')/U \tag{18}$$

Here, $\theta$: actual pitching angular displacement [rad]

Using the actual pitching angular displacement, the external force $F_L$ of the heaving motion represented by the equation (1) in the first embodiment and the external force $F_{PM}$ of the pitching motion represented by the equation (2) in the first embodiment are transformed to the following equations (19) and (20):

$$F_L = (\tfrac{1}{2})\rho U^2 A(C_{LZZ} + C_{LTH}\theta) \tag{19}$$

$$F_{PM} = (\tfrac{1}{2})\rho U^2 Aa(C_{PMZ} + C_{PMTH}\theta) \tag{20}$$

The equation (19) represents the external force in the direction of the heaving motion and the equation (20) represents the external force in the direction of the pitching motion. It is apparent from these equations (18) to (20) that the external forces in the heaving and pitching directions are proportional to the heaving displacement z, and the actual pitching angular displacement $\theta$ that is, the pitching angular displacement, the heaving displacement velocity and the pitching angular displacement velocity. Further, these forces are proportional to the second power of the vehicle running speed and the aerodynamic derivatives $C_{LZ}$, $C_{LTH}$, $C_{PMZ}$ and $C_{PMTH}$ which are necessarily determined in accordance with the configuration of the vehicle.

The equations of motion represented by the equations (3), (4) and (18) to (20) are transformed to state-equation form, and using these equations of state, the heaving motion and the pitching motion are represented by the following equations:

$$Mw' = (-a_f k_f + a_r k_r + qAC_{LTH})\theta + \tag{21}$$
$$(-a_f c_f + a_r c_r qARC_{LTH})p +$$
$$(-k_f - k_r + qAC_{LZ})Z +$$
$$(-c_f - c_r qAC_{LTH})w +$$
$$k_f z_f + c_f w_f + k_r z_r + c_r w_r$$

$$Ip' = (-a_f^2 k_f - a_r^2 k_r + qAaC_{PMTH})\theta + \tag{22}$$
$$(-a_f^2 c_f - a_r^2 c_r - qAaRC_{PMTH})p +$$
$$(-a_f k_f + a_r k_r + qAaC_{PMZ})Z +$$
$$(-a_f c_f + a_r c_r - qAaC_{PMTH})w +$$
$$(a_f k_f) Z_f +$$
$$(a_f c_f)w_f - a_r k_r Z_r - a_r c_r w_r$$

Here, $$Wf = Zf', \ Wr = Zr', \ q = (1/2)\rho U^2 \tag{23}$$

The terms containing the aerodynamic derivatives in the first to fourth terms at the right sides of the equations (21) and (22) represent that the motional characteristics of the vehicle are varied by the aerodynamic force. That is, the action of the aerodynamic force in consideration of the attitude variation of the vehicle is regarded as being equivalent to the action of a spring which produces a force in proportion to a stroke amount of the suspension and the action of a damper which produces a force in proportion to the stroke variation velocity of the suspension.

Paying attention to the second and fourth terms at the right sides of the equations (21) and (22), it is apparent that the damping rate is apparently varied by the aerodynamic force.

As is apparent from the equations (5), (21) and the equations (6), (22), the same treatment may be made to the apparent spring rate even using any one of the pitching angular displacement of the first and second embodiments in which the effect of the aerodynamic force on the damping rate is not considered, and the actual pitching angular displacement of the third embodiment in which the effect of the aerodynamic force on the damping rate is considered. Therefore, in the first and second embodiments the pitching angular displacement containing no apparent damping rate variation is used as shown by the equations (5) and (6), whereas in the third embodiment the actual pitching angular displacement represented by the equation (20) is used to calculate the apparent damping rate variation as shown by the equations (21) and (22).

The coefficients of the second and fourth terms at the right sides of the equations (21) and (22) are represented by the following equations:

$$D_1 = -a_f c_f - a_r c_r + qARC_{LTH} \tag{24}$$

$$D_2 = -c_f c_r - qAaC_{LTH} \tag{25}$$

$$D_3 = -a_f^2 c_f - a_r^2 c_r + qAaRC_{PMTH} \tag{26}$$

$$D_4 = -a_f c_f + a_r c_r + qAaC_{PMTH} \tag{27}$$

The values of $D_1$ to $D_4$ which are based on the value of the vehicle running speed are calculated using the equations (24) to (27) by the control circuit 21 of this embodiment to calculate an apparent damping rate which satisfies such a condition that the variation of a damping rate of a suspension which is represented with some terms (containing the coefficients $c_f$, $c_r$) of the equations $D_1$ to $D_4$ thus calculated (calculation result) is apparently equivalent to the variation of a damping rate of a suspension obtained by an equation of motion which pays no consideration to the aerodynamic derivatives, that is, an equation of motion in which the vehicle running speed U is set to zero, That is, when representing apparent spring rates of front and rear suspensions of the vehicle in a running state thereof by $c_f^*$ and $c_r^*$, $c_f^*$ and $c_r^*$ satisfy the following equation (28).

$$\begin{pmatrix} -a_f & +a_r \\ -1 & -1 \\ -a_f^2 & -a_r^2 \\ a_f & +a_r \end{pmatrix} \begin{pmatrix} c_f^* \\ c_r^* \end{pmatrix} = \begin{pmatrix} D_1 \\ D_2 \\ D_3 \\ D_4 \end{pmatrix} \tag{28}$$

The least square solution of the above equation provides the apparent damping rates of the front and rear wheel suspensions of the vehicle, $c_f^*$ and $c_r^*$, and the difference between the apparent spring rate and the actual spring rate $c_f$, $c_r$, that is, the apparent spring rate variations $\Delta c_f = c_f - c_f^*$, and $\Delta c_r = c_r - c_r^*$ are obtained.

FIG. 10 shows an example of the control circuit 21 according to this embodiment in which these values are sequentially calculated using a microcomputer 51 for a suspension. Alternately, the following manner may be adopted. That is, since the damping rate variation is represented as a function of the vehicle running speed as described above, correction values for representative vehicle running speeds are beforehand stored in a map format, and each of the correction values is stepwise output for any vehicle running speed.

The driving circuit 41 serves to vary and correct the damping rate of the suspension in accordance with the vehicle running speed on the basis of the output signal of the control circuit 21, and control the variable damper mechanism 301.

The variable damper mechanism 301 has been hitherto known as a device for variably adjusting the damping rate of the damper in accordance with a running state of the vehicle. In the variable damper mechanism 301, the diameter of an aperture which is built in the variable damper mechanism is varied by an actuator 302 to adjust resistance against flow of damper oil passing through the aperture, so that the damping rate is variable. The actuator 302 is controlled to be varied and corrected on the basis of the output signal of the driving circuit 41.

Figure 11:
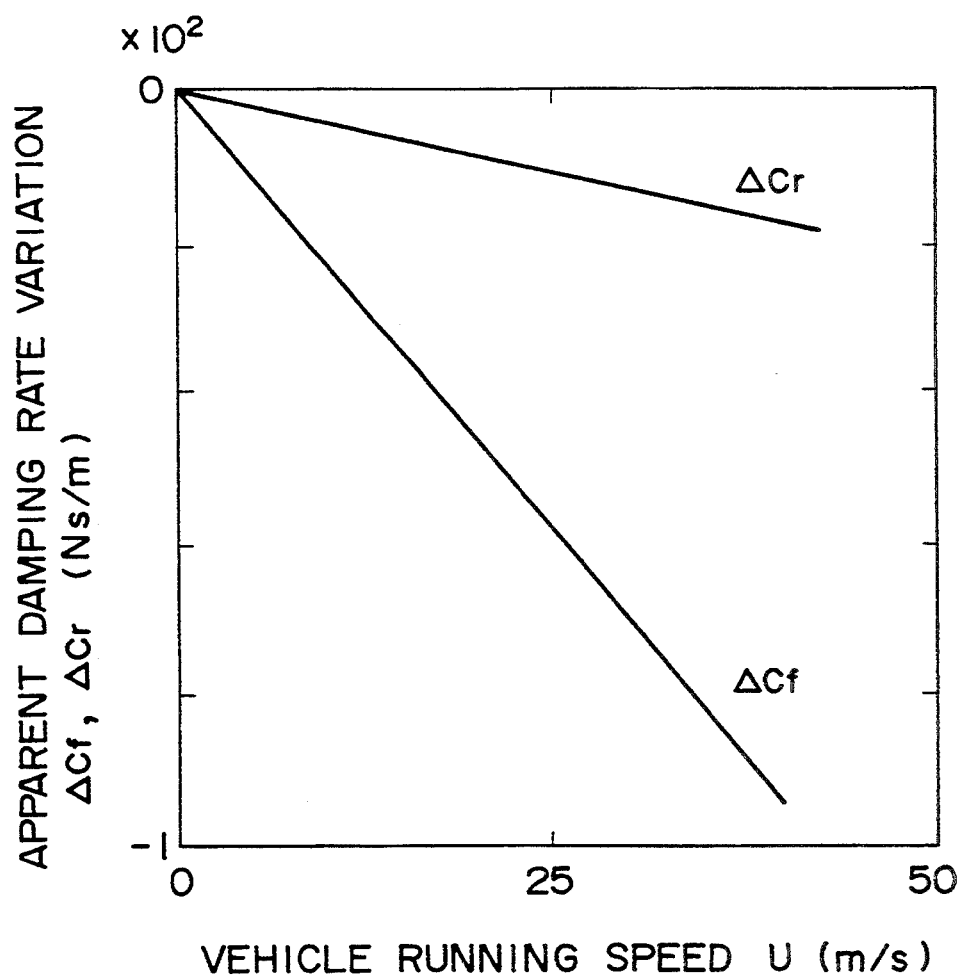
FIG. 11 is a graph showing relationship between a damping rate variation and a vehicle running speed of the third embodiment.

FIG. 11 is a graph showing the apparent damping rate variation calculated in the control circuit 21. In this embodiment, the damping rate is variably controlled (adjusted) on the basis of a relational expression between the apparent damping rate variation and the vehicle running speed as represented by the following equations:

$$c_f = \delta_f U \quad (29)$$

$$c_r = \delta_r U \quad (30)$$

In the above equations (29) and (30), $\delta_f$ and $\delta_r$ are constants which are determined on the basis of the item of a vehicle. In this embodiment, the following values are used as an example for a normal-size passenger car:

$$\delta_f = -2.4, \text{ and } \delta_r = -0.43 [N.S^2/m^3]$$

Further, for a lighter-weight compact passenger car, the following values are used as an example.

$$\delta_f = -2.0, \text{ and } \delta_r = -0.27 [N.S^2/m^3]$$

As described above, the damping rate of the suspension which would apparently vary in accordance with increase or reduction of the vehicle running speed can be controlled not to be dependent on any vehicle running speed from a lower speed to a higher speed by varying and correcting the damping rate of the suspension so as to offset the apparent damping-rate variation, thereby achieving vehicle characteristics having stable drive feeling and driving performance.

Figure 12:
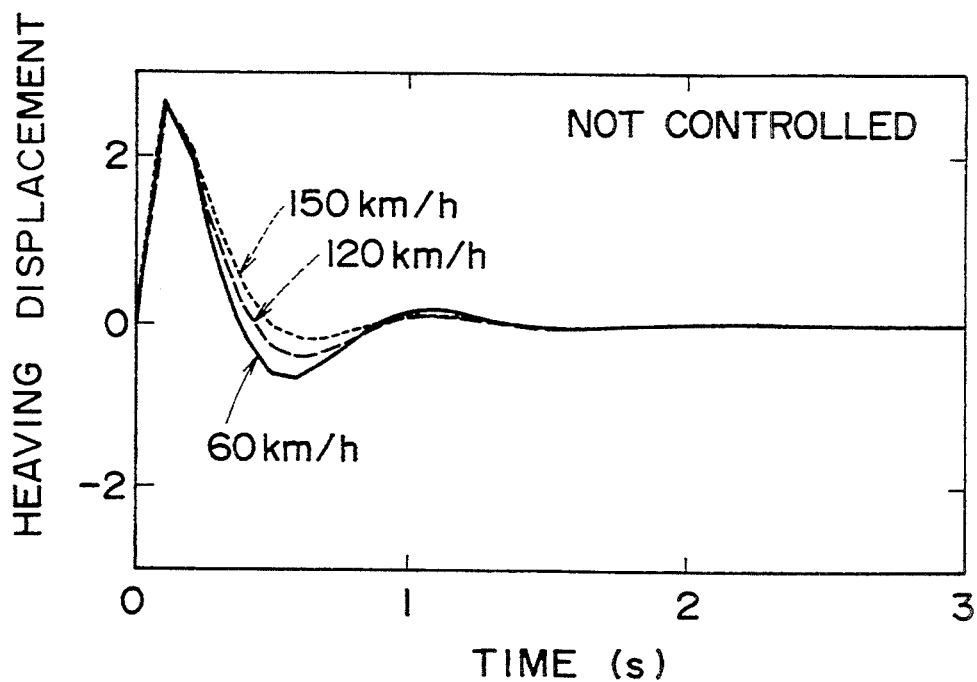
FIG. 12 is a graph showing a response characteristic of a vehicle in the prior art.
Figure 13:
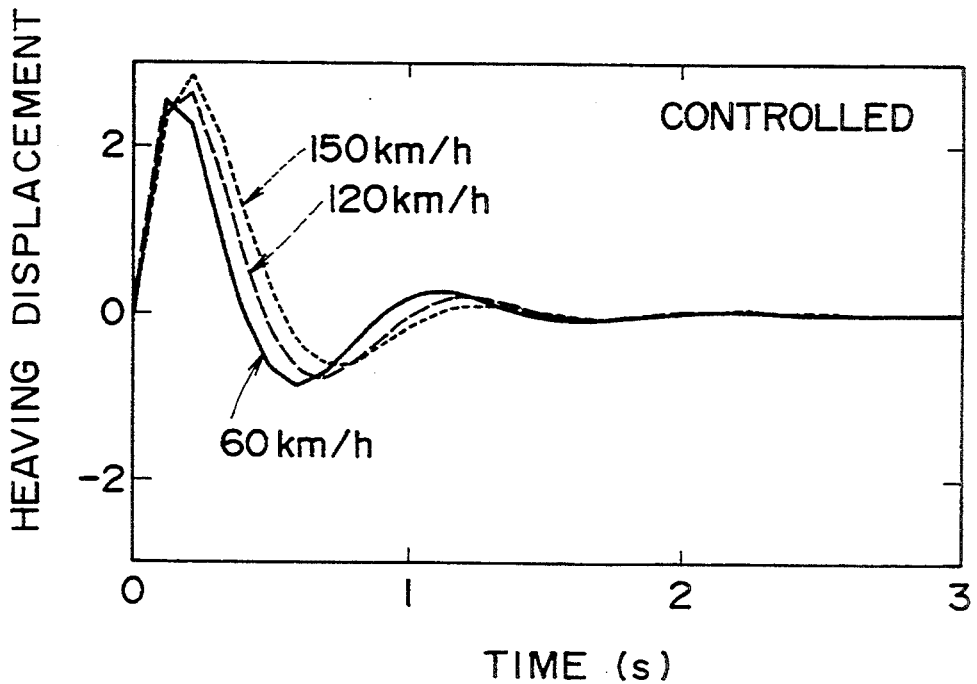
FIG. 13 is a graph showing a response characteristic of a vehicle in the third embodiment.

FIG. 12 shows response characteristics of a vehicle in the prior art, and FIG. 13 shows response characteristics of a vehicle in the suspension control device according to this invention.

FIGS. 12 and 13 are graphs showing an impulse response characteristic representing the displacement of the attitude of the vehicle with time lapse when the vehicle passes over a fine step during its straight running.

For the prior art having no control operation shown in FIG. 12, a first valley of the heaving displacement is greatly varied in accordance with the vehicle running speed when the vehicle suffers an external disturbance during its running, and the vehicle has different behaviors (motions) between high-speed and low-speed running states of the vehicle. Therefore, in this case the drive feeling of the vehicle is varied in accordance with the vehicle running speed, and a driver and others in a vehicle have an unfavorable feeling to a driving.

On the other hand, for this embodiment having a control operation shown in FIG. 13, the variation of the transient response with time lapse have a substantially invariable waveform even when the vehicle running speed varies. That is, the drive feeling is not varied between high-speed and low-speed running states of the vehicle, and thus the drive feeling at the low-speed state can be obtained at the high-speed state.

(Fourth Embodiment)

In a fourth embodiment, the calculation manner of the suspension control circuit 21 is altered in the suspension control device for a vehicle according to the first embodiment, and the suspension control device is applied to a vehicle in which the spring rate and the damping rate of the suspension can be simultaneously variably controlled.

The suspension control device of the fourth embodiment includes a vehicle running speed sensor 11, a control circuit 21, a driving circuit 41, and a variable damper mechanism 301 and an air spring mechanism 101 which are control targets, as shown in FIG. 10.

The vehicle running speed sensor 11 comprises a speedometer, an airspeed sensor or the like, and serves to output an electrical signal corresponding to a detected speed as a vehicle speed signal U. The control circuit 21 serves to calculate apparently-varying spring rate and damping rate values on the basis of the vehicle speed signal U, and output the calculated values as apparent spring rate and damping rate variations.

The calculation of the apparent spring rate and damping rate variations in the control circuit 21 will be hereunder described.

The terms containing the aerodynamic derivatives in the first to fourth terms at the right sides of the equations of state (21) and (22) of the third embodiment represent that the motion characteristics of the vehicle are varied by the aerodynamic force. That is, the following equations represent that the spring rate and the damping rate are apparently varied by the aerodynamic force.

$$B_1 = -a_f^2 k_f - a_r^2 k_r + qAaC_{PMTH} \quad (31)$$

$$B_2 = -a_f k_f + a_r k_r + qAaC_{PMZ} \quad (32)$$

$$B_3 = -a_f k_f + a_r k_r + qAC_{LTH} \quad (33)$$

$$B_4 = -k_f - k_r - qAC_{LZ} \quad (34)$$

$$B_5 = -a_f c_f + a_r c_r - qARC_{LTH} \quad (35)$$

$$B_6 = -c_f c_r - qAC_{LTH} \quad (36)$$

$$B_7 = -a_f^2 c_f - a_r^2 c_r + qAaRC_{PMTH} \quad (37)$$

$$B_8 = -a_f c_r + a_f c_r - qAaC_{PMTH} \quad (38)$$

The values of $B_1$ to $B_8$ which are based on the value of the vehicle running speed are calculated using the equations (31) to (38) by the control circuit 21 of this embodiment to calculate apparent spring rate and damping rate which satisfy such a condition that a spring rate variation and a damping rate variation of a suspension which are represented with some terms (containing the coefficients $k_f$, $k_r$, $c_f$, $c_r$) of the equations $B_1$ to $B_8$ thus calculated (calculation result) are apparently equivalent to a spring rate variation and a damping rate variation of a suspension obtained by an equation of motion which pays no consideration to the aerodynamic derivatives, that is, an equation of motion in which the vehicle running speed U is set to zero, That is, when representing apparent spring rates and damping rates of front and rear suspensions of the vehicle in a running state thereof by $k_f^*$, $k_r^*$ and $c_f^*$, $c_r^*$ respectively, the values of $k_f^*$, $k_r^*$ and $c_f^*$, $c_r^*$ satisfy the following equations (39) and (40).

$$\begin{pmatrix} -a_f^2 & -a_r^2 \\ -a_f & +a_r \\ -a_f & +a_r \\ -1 & -1 \end{pmatrix} \begin{pmatrix} k_f^* \\ k_r^* \end{pmatrix} = \begin{pmatrix} B_1 \\ B_2 \\ B_3 \\ B_4 \end{pmatrix} \quad (39)$$

$$\begin{pmatrix} -a_f & +a_r \\ -1 & -1 \\ -a_f^2 & -a_r^2 \\ -a_f & +a_r \end{pmatrix} \begin{pmatrix} c_f^* \\ c_r^* \end{pmatrix} = \begin{pmatrix} B_5 \\ B_6 \\ B_7 \\ B_8 \end{pmatrix} \quad (40)$$

The least square solution of the above equation provides the apparent spring rates $k_f^*$ and $k_r^*$ and the apparent damping rates $c_f^*$ and $c_r^*$ of the front and rear wheel suspensions of the vehicle, and outputs the difference between the apparent spring rates and the actual spring rates $k_f$, $k_r$, that is, the apparent spring rate variations $\Delta k_f = k_f - k_f^*$, and $\Delta k_r = k_r - k_r^*$, and the difference between the apparent damping rates and the actual damping rates $c_f$, $c_r$, that is, the apparent damping rate variations $\Delta c_f = c_f - c_f^*$, and $\Delta c_r = c_r - cr^*$.

FIG. 10 shows an example of the control circuit 21 according to this embodiment in which these values are sequentially calculated using a microcomputer 51 for the suspension of the vehicle. Alternately, the following manner may be adopted. That is, since the spring (damping) rate variation is represented as a function of the vehicle running speed as described above, correction values for representative vehicle running speeds are beforehand stored in a map format, and each of the correction values is stepwise output for any vehicle running speed.

The driving circuit 41 serves to vary and correct the spring rate and the damping rate of the suspension in accordance with the vehicle running speed based on the output signal of the control circuit 21, and control the air spring mechanism 101 and the variable damper mechanism 301.

The air spring mechanism 101 has been hitherto known as an air spring type suspension device, and comprises the variable damper mechanism 301 whose lower end portion is secured to an arm 115 serving as a wheel shaft member, a piston rod 113 whose top end portion is secured to a vehicle body 116, and an air chamber 114 provided between the variable damper mechanism 301 and the piston rod 113. The up-and-down vibration of the vehicle body is elastically supported by the pressure of air which is sealingly filled in the air chamber 114. The spring rate of the suspension can be varied by supplying air to the air chamber 114 or discharging the air from the air chamber 114. The air supply and discharge operation into and from the air chamber 114 is controlled by solenoid valves 111 and 121, and the air amount to be supplied to or discharged from the air chamber 114 is varied and corrected on the basis of the output signal of the driving circuit 41.

The variable damper mechanism 301 has been hitherto known as a device for variably adjusting the damping rate of the damper in accordance with the running state of the vehicle. The diameter of an aperture which is formed in the variable damper mechanism is varied by an actuator 302 to adjust resistance against flow of damper oil passing through the aperture, thereby varying the damping rate. The actuator 302 is controlled to be varied and corrected on the basis of the output signal of the driving circuit 41.

FIG. 14 is a graph showing the apparent spring rate variation calculated in the control circuit 21, and FIG. 15 is a graph showing the apparent damping rate variation calculated in the control circuit 21 together with the calculation of the spring rate. In this embodiment, the damping rate is variably controlled (adjusted) on the basis of relational expressions between each of the apparent spring rate variation and the apparent damping rate variation and the vehicle running speed as represented by the following equations:

$$k_f = \beta_f U^2 \quad (41)$$

$$k_r = \beta_r U^2 \quad (42)$$

$$c_f = \gamma_f U \quad (43)$$

$$c_r = \gamma_r U \quad (44)$$

In the above equations (41) to (44), the values of $\beta_f$, $\beta_r$, $\gamma_f$, $\gamma_r$ are constants which are determined on the basis of the item of a vehicle. In this embodiment, the following values are used as an example for a normal-size passenger car:

$$\beta_f = 0.79, \beta_r = 0.44 [N \cdot S^2/m^3]$$

$$\gamma_f = -2.4, \gamma_r = -0.43 [N \cdot S^2/m^2]$$

Further, for a lighter-weight compact passenger car, the following values are used as an example.

$$\beta_f = 0.74, \beta_r = 0.36 [N \cdot S^2/m^3]$$

$$\gamma_f = -2.0, \gamma_r = -0.27 [N \cdot S^2/m^2]$$

As described above, the spring rate and the damping rate of the suspension which would apparently vary in accordance with increase or reduction of the vehicle running speed can be controlled not to be dependent on any vehicle running speed from a lower speed to a higher speed by varying and correcting the spring rate and the damping rate of the suspension so as to offset the apparent spring-rate variation and the apparent damping-rate variation, thereby achieving vehicle characteristics having stable drive feeling and driving performance.

Figure 16:
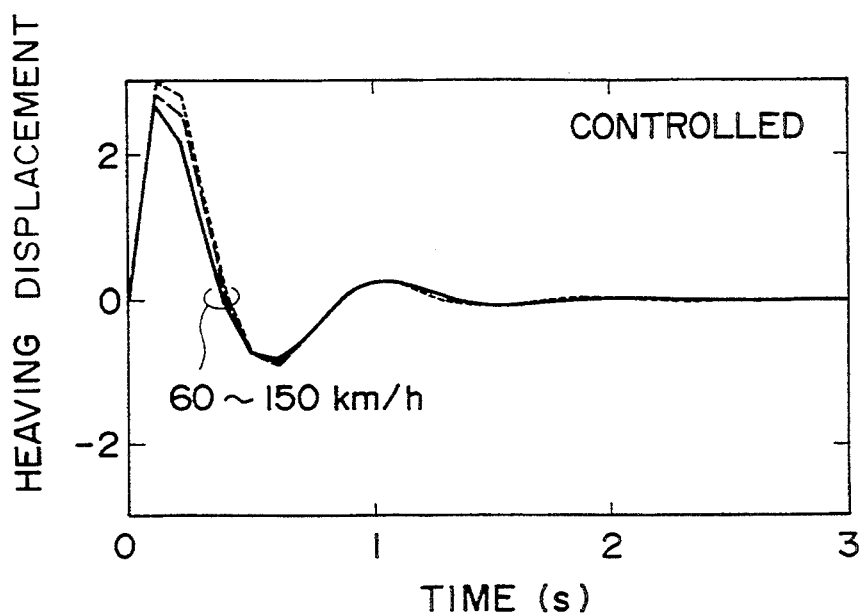
FIG. 16 is a graph showing a response characteristic of a vehicle in the fourth embodiment.

FIGS. 12 and 16 are graphs showing an impulse response characteristic representing the displacement of the attitude of the vehicle with time lapse when the vehicle passes over a fine step during its straight running.

For the prior art having no control operation shown in FIG. 12, a first valley of the heaving displacement is greatly varied in accordance with the vehicle running speed when the vehicle suffers an external disturbance during its running, and the vehicle has different behaviors (motions) between high-speed and low-speed running states of the vehicle. Therefore, in this case the drive feeling of the vehicle is varied in accordance with the vehicle running speed, and a driver and others in a vehicle have an unfavorable feeling to a driving.

On the other hand, for this embodiment having a control operation shown in FIG. 16, the variation of the transient response with time lapse have a substantially invariable waveform even When the vehicle running speed varies. That is, the drive feeling is not varied between high-speed and low-speed running states of the vehicle, and thus the drive feeling at the low-speed state can be obtained at the high-speed state.

(Fifth Embodiment)

In a fifth embodiment, the suspension control device of the fourth embodiment is applied to a vehicle in which the spring rate and the damping rate of the suspension can be simultaneously variably controlled. In this embodiment, a wagon whose weight is above 1.7 m is representatively applied as a vehicle.

Figure 17:
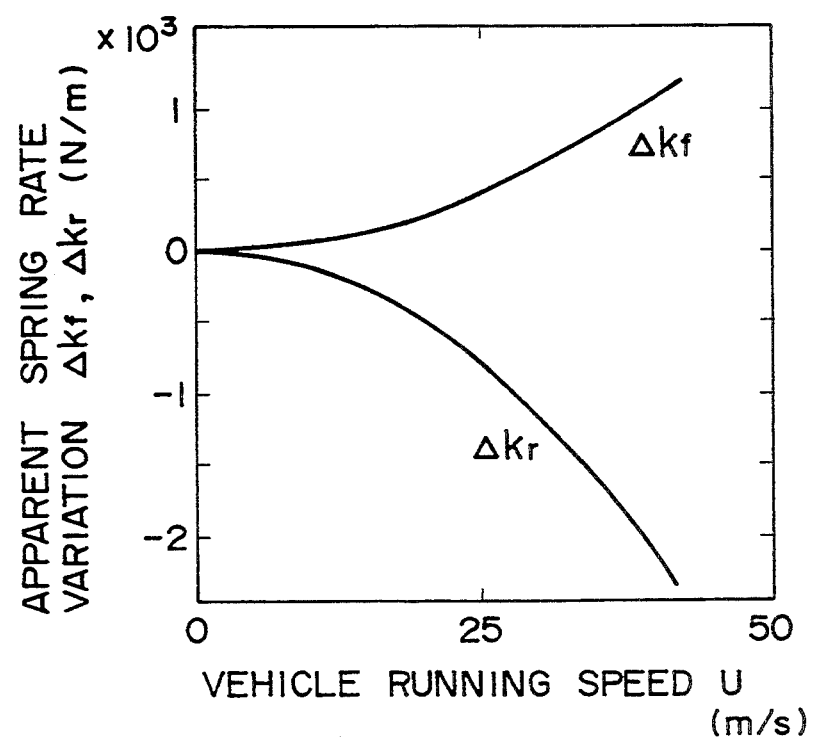
FIG. 17 is a graph showing relationship between a spring rate variation and a vehicle running speed of the fifth embodiment.

FIG. 17 is a graph showing an apparent spring rate variation calculated in the control circuit 21, and FIG. 18 is a graph showing an apparent damping rate variation calculated in the control circuit 21 simultaneously with the calculation of the apparent spring rate variation. In this embodiment, the damping rate is variably controlled on the basis of a relational expression between the vehicle running speed and each of the apparent spring and damping rate variations represented by the equations (41) to (44).

In the equations (41) to (44), $\beta_f$, $\beta_r$, $\gamma_f$, $\gamma_r$ are constants which are determined on the basis of the item of a vehicle, and the following values are used as an example in this embodiment.

$\beta_f = 0.69$, $\beta_r = -1.39 [N.S^2/m^3]$ $\gamma_f = -1.5$, $\gamma_r = 2.0 [N.S^2/m^2]$ Further, for a lighter-weight compact passenger car, the following values are used as an example.

$\beta_f = 0.79$, $\beta_r = -1.38 [N.S^2/m^3]$ $\gamma_f = -1.8$, $\gamma_r = 1.4 [N.S^2/m^2]$ An effect of the suspension control device of this embodiment is shown in FIG. 20, as compared with the prior art shown in FIG. 19.

Figure 19A:
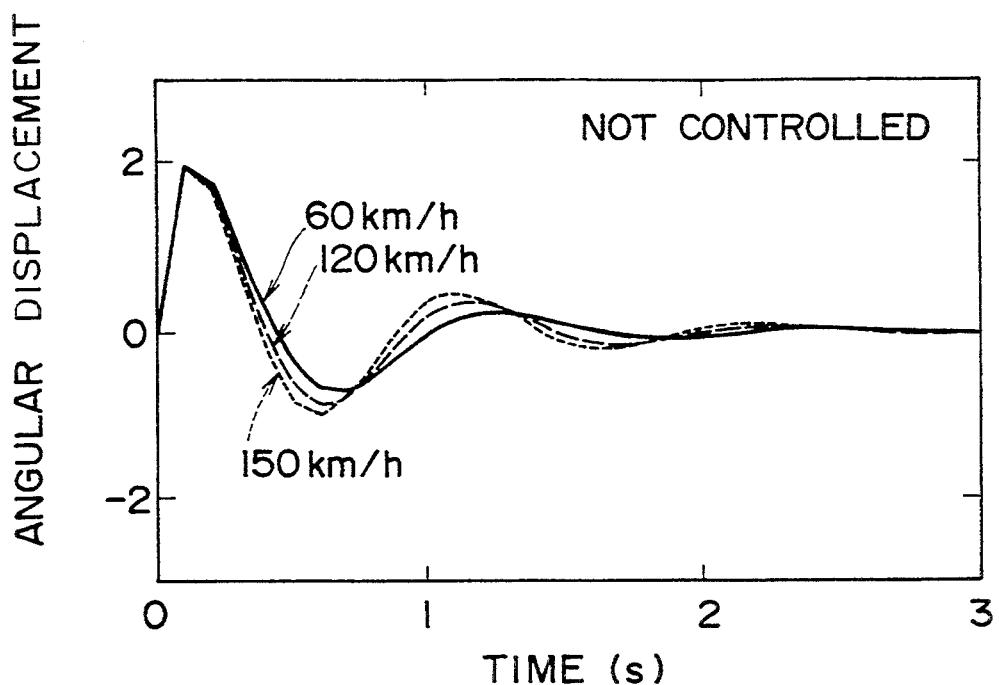
FIGS. 19A and 19B are graphs showing response characteristics of a vehicle in the prior art.
Figure 19B:
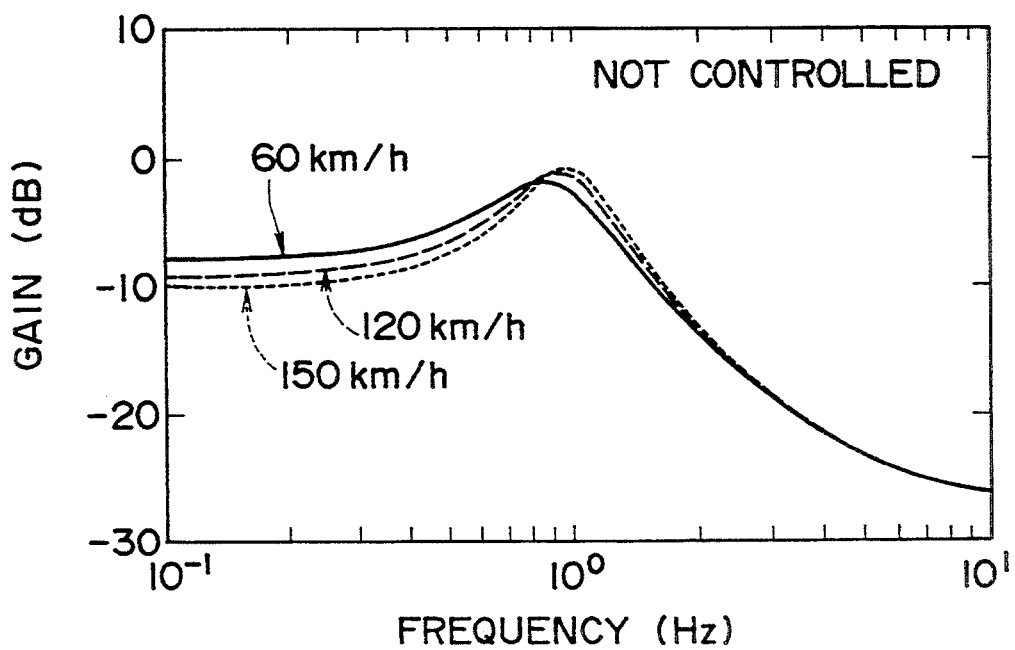
Figure 20A:
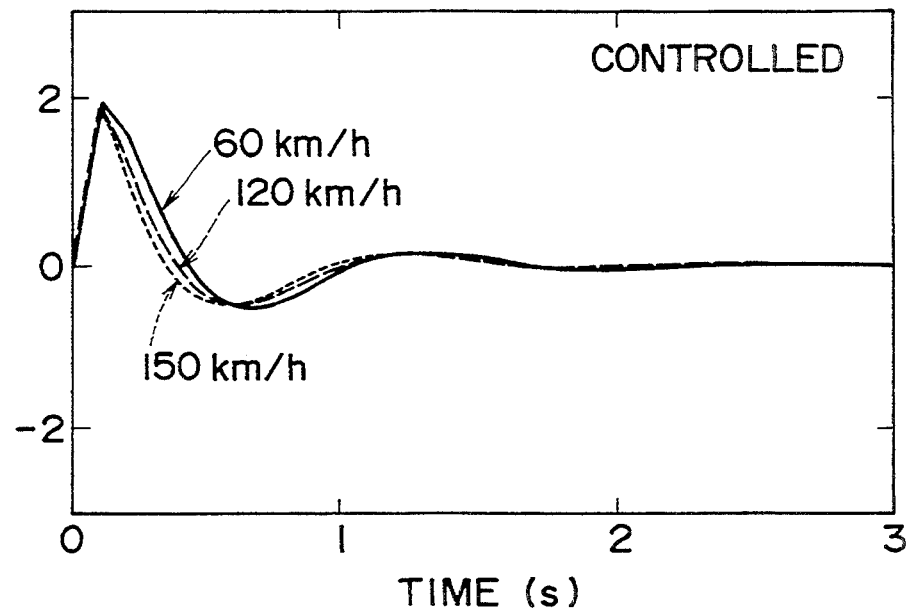
FIGS. 20A and 20B are graphs showing response characteristics of a vehicle in the fifth embodiment.
Figure 20B:
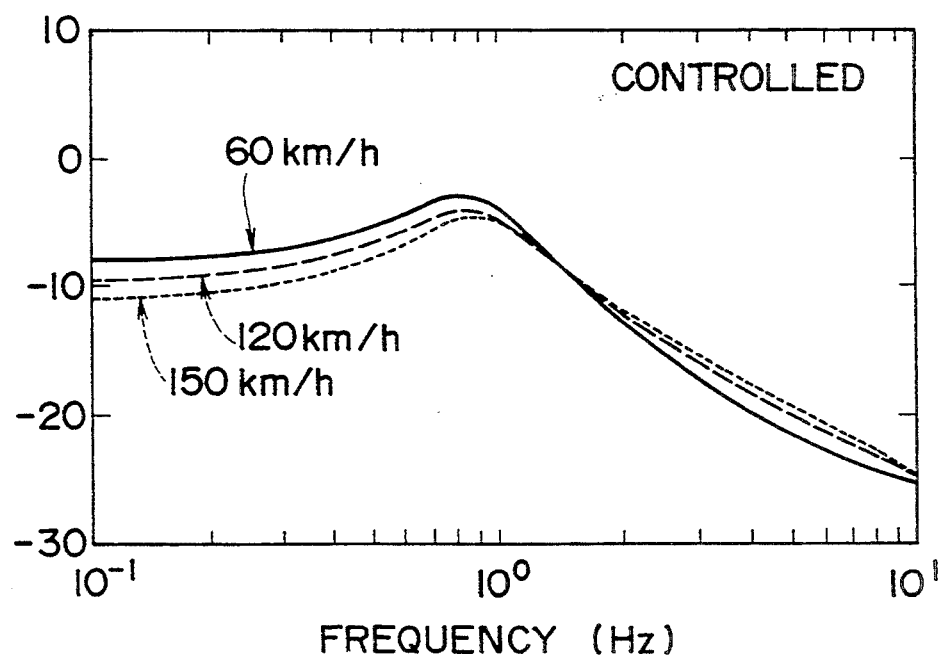

FIGS. 19A and 20A show an impulse response characteristic which represents displacement of the attitude of a vehicle with time lapse when the vehicle passes over a fine step when it moves straightly, and FIGS. 19B and 20B show a transient response of the displacement of the vehicle attitude in a frequency band at the time when the vehicle passes over the fine step.

For the prior art having no control operation, as shown in FIG. 19A and 19B, the angular displacement becomes rapid as the vehicle running speed is increased when the vehicle suffers an external disturbance during its running, and thus the drive feeling tends to be deteriorated. Further, the amplitude of the waveform is intensified as the vehicle running speed is increased, and this means that the drive feeling and the driving performance tend to be deteriorated. This is proved by the fact shown in FIG. 19(B) that the resonance frequency is increased as the vehicle running speed is increased.

On the other hand, for this embodiment having a control operation as shown in FIG. 20, the variation of the resonance frequency is reduced as shown in FIG. 20B, and at the same time the variation of the amplitude of the waveform is also reduced as shown in FIG. 20A. That is, the transient response with time lapse has substantially the same waveform irrespective of the variation of the vehicle running speed, and the same degree of transient response to the external force at the low vehicle running speed can be obtained at high vehicle running speed.

In this embodiments, the polarity of the values $\beta_f$, $\beta_r$, $\gamma_f$, $\gamma_r$ is opposite to that of the fourth embodiment. That is, the effect of the aerodynamic force is not uniform for all vehicles, and thus the spring rate and the damping rate must be controlled in accordance with not only the vehicle running speed, but also the aerodynamic characteristics of a vehicle having the suspension control device of this embodiment.

As described above, by varying and correcting the spring rate and the damping rate of the suspension so as to offset the apparent spring rate variation and the apparent damping rate variation, the spring rate and the damping rate which apparently vary in accordance with increase or reduction of the vehicle running speed can be set to be independent of any vehicle running speed from a lower speed to a higher speed, so that vehicle characteristics having invariable drive feeling and drive performance (controllability) can be realized.

(Sixth Embodiment)

In a sixth embodiment, the calculation manner of the suspension control circuit 21 is altered in the suspension control device for a vehicle according to the fourth embodiment, and the suspension control device is applied to a vehicle, which device variably controls the spring rate and the damping rate of the suspension with a time lag from a time when the external disturbance is input.

The suspension control device of the sixth embodiment includes the vehicle running speed sensor 11, the control circuit 21, the driving circuit 41, and the variable damper mechanism 301, the air spring mechanism 101 which are control targets, as shown in FIG. 10, and an external disturbance sensor (not shown).

The vehicle running speed sensor 11 comprises a speedometer, an airspeed sensor or the like, and serves to output an electrical signal corresponding to a detected speed as a vehicle speed signal U. The external disturbance sensor (not shown) is a sensor for measuring at least one of a displacement, a velocity or an acceleration of the heaving motion of the vehicle, an angular displacement, an angular velocity or an angular acceleration of the pitching motion of the vehicle, a displacement, a velocity or an acceleration of an unsprung portion, a force acting on the spring mechanism, and a force acting on the damper mechanism, and the sensor serves to output a corresponding electric signal as an external disturbance signal.

The control circuit 21 serves to calculate apparently-varying spring rate and damping rate values on the basis of the vehicle speed signal U, and output the calculated values as apparent spring rate and damping rate variations after a predetermined time elapse when the external disturbance signal exceeds a predetermined value.

The calculation of the apparent damping rate variation and the apparent spring rate variation are the same as the fourth embodiment, and the other construction is substantially the same as the fourth embodiment.

An effect of the suspension control device of this embodiment is shown in FIG. 21, as compared to the result of the fourth embodiment shown in FIG. 16.

FIGS. 16 and 21 show an impulse response characteristic representing the displacement of the attitude of a vehicle with time lapse when the vehicle passes over a fine step during its straight running.

As is apparent from FIG. 16 showing the result of the fourth embodiment, the maximum value of a first displacement amplitude after the vehicle passes over the fine step during its straight running is varied in accordance with the vehicle running speed.

In order to further improve the effect of the fourth embodiment, in the sixth embodiment a time lag is provided when signals representing the variations of the spring rate and damping rate are output from the control circuit 21. In this embodiment, the control circuit 21 calculates the apparent spring rate variation and the damping rate variation corresponding to the vehicle running speed. When an external disturbance signal from an unsprung acceleration sensor serving as the external disturbance sensor exceeds 1G, the apparent variations are output after 0.25 second elapses.

In the embodiment shown in FIG. 21, the transient response with time lapse, containing the amplitude variation of the first maximum value after the vehicle passes over the fine step, has substantially invariable waveform irrespective of the variation of the vehicle running speed. That is, it is apparent that the same transient response to the external disturbance and the drive feeling at the low vehicle running speed can be also obtained at the high vehicle running speed.

(Seventh Embodiment)

Next, a seventh embodiment in which the spring rate and the damping rate are controlled in consideration of load (weight) distribution of front and rear wheels for the vehicle suspension control device of the fourth embodiment will be described.

Figure 22:
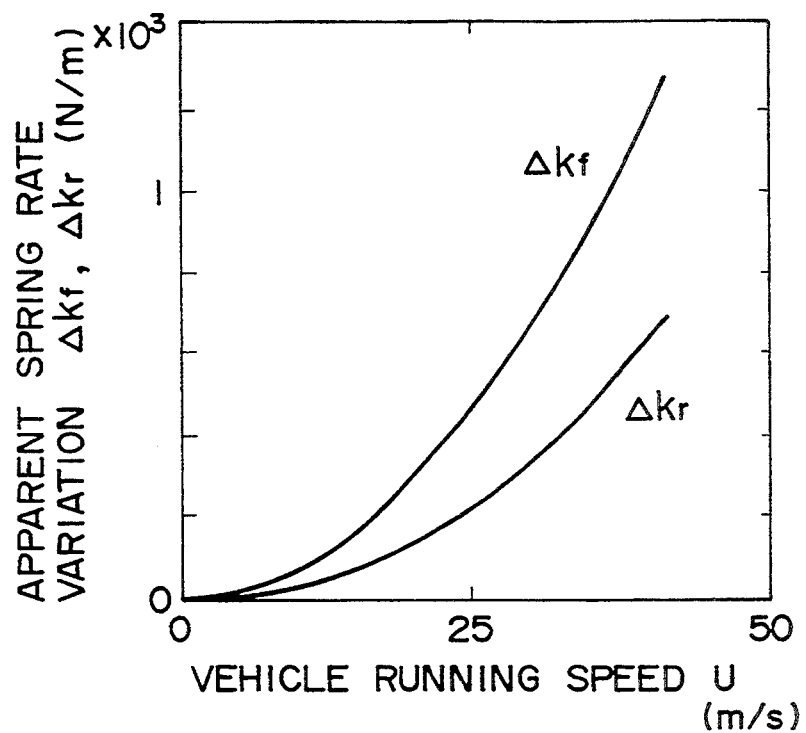
FIG. 22 is a graph showing relationship between a spring rate variation and a vehicle running speed of the seventh embodiment.
Figure 23:
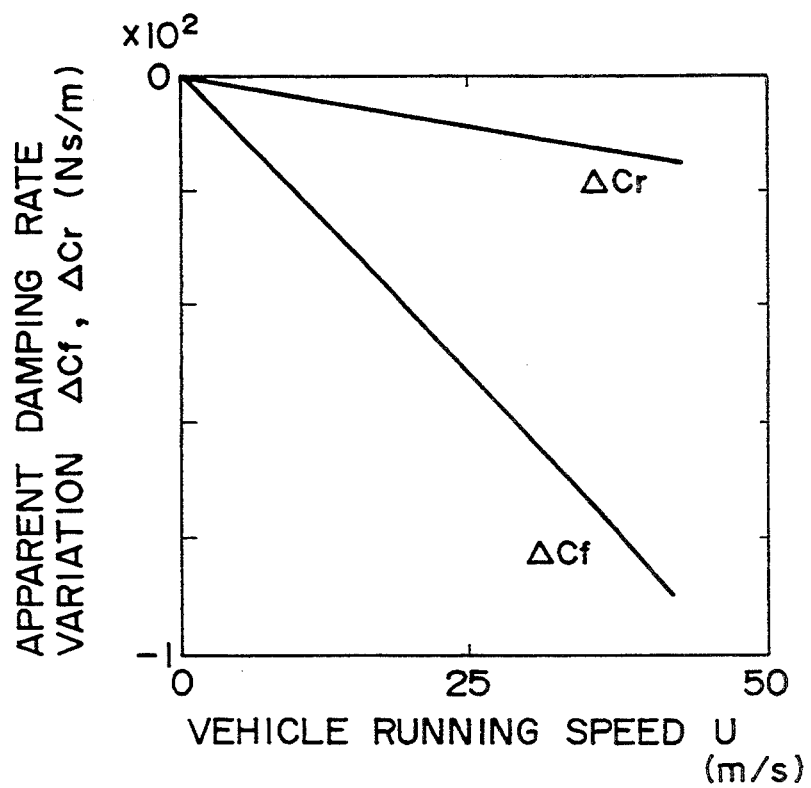
FIG. 23 is a graph showing relationship between a damping rate variation and a vehicle running speed of the seventh embodiment.

FIG. 22 shows an example of variation of the apparent spring rate which is calculated by the control circuit 21, and FIG. 23 shows an example of variation of the apparent damping rate which is simultaneously calculated by the control circuit 21.

The load (weight) distribution of the front and rear wheels of the vehicle may be treated as the position of the center of gravity of the vehicle. Therefore, representing the distance between the shaft axis position of the front and rear wheels and the position of the center of gravity by e, the relationship between the height z of the shaft axis position of the front and rear wheels and the actual heaving displacement Z of the gravity center position is represented by the following equations $$Z = z - e\theta \tag{98}$$

Here, e: the distance between the shaft axis position of the front and rear wheels and the gravity center position [m]

Z: the actual heaving displacement of the gravity center position [m]

Using the equation (98), the external force $F_L$ of the heaving motion and the external force moment $F_{PM}$ of the pitching motion shown in the third embodiment are represented as follows:

$$F_L = (\tfrac{1}{2})\rho U^2 A(C_{LZ}Z + C_{LTH}\theta) \tag{99}$$

$$\begin{aligned} F_{PM} = &(\tfrac{1}{2})\rho U^2 Aa(C_{PMZ} + C_{PMTH}\theta) \\ &+ (\tfrac{1}{2})e\rho U^2 A(C_{LZ} + C_{LTH}\theta) \end{aligned} \tag{100}$$

By transforming to state equations the equation of motion represented by the equations (21) and (22) and the terms of the external force and the external force moment represented by the equations (97) to (99) in the third embodiment, and rewriting $\theta$ to $\theta$ and Z to z, the heaving motion and the pitching motion are represented as follows:

$$\begin{aligned} Mw' = &(-a_f k_f + a_r k_r + qAC_{LTH} - eqAC_{LZ})\theta + \\ &(-a_f c_f + a_r c_r - qARC_{LTH}/U)p + \\ &(-k_f - k_r + qAC_{LZ})z + \\ &(-c_f - c_r - qAC_{LTH})W + \\ &k_f z_f + c_f w_f + k_r z_r + c_r w_r \end{aligned} \tag{101}$$

$$\begin{aligned} Ip' = &(-a_f^2 k_f - a_r^2 k_r + qAaC_{PMTH} - \\ &eqAaC_{PMZ} - eqAC_{LTH} + e^2 qAC_{LZ})\theta + \\ &(-a_f^2 c_f - a_r^2 c_r - qAaRC_{PMTH}/U + \\ &eqARC_{LTH}/U)p + \\ &(-a_f k_f + a_r k_r + qAaC_{PMZ} - eqAC_{LZ})z + \\ &(-a_f c_f + a_r c_r - qAaC_{PMTH}/U + \\ &eqAC_{LTH}/U)w + \\ &a_f k_f z_f + a_f c_f w_f - a_r k_r z_r - a_r c_r w_r \end{aligned} \tag{102}$$

Here, $$w_f = z_f', \; w_r = z_r', \; q = (1/2)\rho U^2 \tag{103}$$

The terms containing aerodynamic derivatives in first to fourth terms at the right side of the above state equations (101) and (102) represent that the motional characteristics of the vehicle are varied by the aerodynamic force. That is, the following equations represent that the damping rate and the spring rate are apparently varied by the aerodynamic force.

$$G_1 = -a_f^2 k_f - a_r^2 k_r + qAaC_{PMTH} - eqAaC_{PMZ} - eaAC_{LTH} + e^2 qAC_{LZ}$$

$$G_2 = -a_f k_f + a_r k_r + qAaC_{PMZ} - eqAC_{LZ}$$

$$G_3 = -a_f k_f + a_r k_r + qAaC_{LHT} - eqAC_{LZ}$$

$$G_4 = -k_f - k_r + qAC_{LZ}$$

$$G_5 = -a_f c_f + a_r c_r - qARC_{LTH}/U$$

$$G_6 = -c_f - c_r - qAC_{LTH}/U$$

$$G_7 = -a_f^2 c_f - a_r^2 c_r - qAaRC_{PMTH}/U + eqARC_{LTH}/U$$

$$G_8 = -a_f c_f + a_r c_r - qAaC_{PMTH}/U + eqAC_{LTH}/U \tag{104-111}$$

Values of $G_1$ to $G_8$ which are based on the vehicle running speed are calculated using the equations (16) to (23) in the control circuit 21 according to this embodiment to calculate an apparent damping rate and an apparent spring rate which satisfy such a condition that the variations of a damping rate and a spring rate of a suspension which are obtained by the equations $G_1$ to $G_8$ thus calculated (calculation result) are apparently equivalent to the variations of a damping rate and a spring rate of a suspension obtained by an equation of motion which equation of motion in which the vehicle running speed U is set to zero, That is, when representing the apparent damping rate and the apparent spring rates of front and rear suspensions of the vehicle in a running state by $c_f^*$, $c_r^*$ and $k_f^*$, $k_r^*$ respectively, $c_f^*$, $c_r^*$, $k_f^*$ and $k_r^*$ satisfy the following equations (112) and (113).

$$\begin{pmatrix} -a_f^2 & -a_r^2 \\ -a_f & +a_r \\ -a_f & +a_r \\ -1 & -1 \end{pmatrix} \begin{pmatrix} k_f^* \\ k_r^* \end{pmatrix} = \begin{pmatrix} G_1 \\ G_2 \\ G_3 \\ G_4 \end{pmatrix} \quad (112)$$

$$\begin{pmatrix} -a_f & +a_r \\ -1 & -1 \\ -a_f^2 & +a_r^2 \\ -a_f & -a_r \end{pmatrix} \begin{pmatrix} c_f^* \\ c_r^* \end{pmatrix} = \begin{pmatrix} G_5 \\ G_6 \\ G_7 \\ G_8 \end{pmatrix} \quad (113)$$

The least square solutions of the above equations provide the apparent damping rates $c_f^*$ and $c_r^*$ and the apparent spring rates $k_f^*$ and $k_r^*$ of the front and rear wheel suspensions of the vehicle, and output the difference between the apparent damping rates and the actual damping rates $c_f$, $c_r$, that is, the apparent damping rate variations $\Delta c_f = c_f - c_f^*$, and $\Delta c_r = c_r - c_r^*$, and the difference between the apparent spring rates and the actual spring rates $k_f$, $k_r$, that is, the apparent spring rate variations $\Delta k_f = k_f - k_f^*$, and $\Delta k_r = k_r - k_r^*$.

$$k_f = \xi_f U^2 \quad (114)$$

$$k_r = \xi_r U^2 \quad (115)$$

$$c_f = \eta_f U \quad (116)$$

$$c_r = \eta_r U \quad (117)$$

In the above equations (114) to (117), the values of $\xi_f$, $\xi_r$, $\eta_f$, $\eta_r$ are constants which are determined on the basis of the item of a vehicle. In this embodiment, the following values are used as an example for a normal-size passenger car (where center of gravity is shifted from the center position of the wheel base to the front wheel side by 10% of the wheel base):

$$\xi_f = 0.73, \xi_r = 0.38 [N.S^2/m^3]$$

$$\eta_f = -2.2 \ \eta_r = -0.35 [N.S^2/m^2]$$

Further, the following values are used as an example for a lighter-weight compact passenger car:

$$\xi_f = 0.68, \xi_r = 0.30 [N.S^2/m^3]$$

$$\eta_f = -1.9 \ \eta_r = -0.21 [N.S^2/m^2]$$

Furthermore, the following values are used as an example for a wagon having a height of 1.7 m or more (where center of gravity is shifted from the center position of the wheel base to the front wheel side by 10% of the wheel base );

$$\xi_f = 0.34, \xi_r = -1.7 [N.S^2/m^3]$$

$$\rho_f = -0.6, \rho_r = 2.3 [N.S^2/m^2]$$

In addition, the following values are used as an example for a lighter-weight wagon:

$$\xi_f = 0.42, \xi_r = -1.7 [N.S^2/m^3]$$

$$\rho_f = -0.9, \rho_r = 1.7 [N.S^2/m^2]$$

In the seventh embodiment, the spring rate and the damping rate can be properly set in consideration of shift of center of gravity. Further, by newly providing sensor for detecting loads of the front and rear wheels, the shift of center of gravity is calculated to set the spring rate and the damping rate in consideration of the shift of center of gravity at an actual running time.

As described in the first to seventh embodiments, variations of the apparent spring rate and the apparent damping rate are affected by the type of a vehicle, the specification of a vehicle, and the shift of center of gravity. A proportional constant which determines the apparent spring rate preferably falls in the following ranges (where unit is $N.S^2/m^3$): when the vehicle is a passenger car whose height is less than 1.7 m, 0.5 to 1.4 for the front wheels and 0.2 to 0.5 for the rear wheels; and when a passenger car whose height is above 1.7 m, 0.2 to 1.7 for the front wheels and $-2.7$ to $-1.2$ for the rear wheels. A proportional constant which determines the apparent damping rate preferably falls in the following ranges (where unit is $N.S^2m^2$): when the vehicle is a passenger car whose height is less than 1.7 m, $-2.5$ to $-1.8$ for the front wheels and $-0.5$ to $-0.1$ for the rear wheels; and when a passenger car whose height is above 1.7 m, $-1.9$ to $-0.5$ for the front wheels and 1.0 to 3.0 for the rear wheels.

What is claimed is:

1. A suspension control device for a vehicle comprising:
   vehicle speed detecting means for detecting a vehicle running speed;
   at least one spring rate variation calculating means for calculating variation of apparent spring rate of a suspension of a vehicle due to a change of the vehicle running speed on the basis of the vehicle running speed detected by said vehicle speed detecting means, and damping rate variation calculating means for calculating variation of an apparent damping rate of the suspension of the vehicle due to a change of the vehicle running speed on the basis of the vehicle running speed detected by the vehicle speed detecting means; and
   at least one of spring rate variable correction means for varying and correcting the apparent spring rate of the vehicle suspension to a predetermined value on the basis of the variation of the spring rate, and damping rate variable correction means for varying and correcting an apparent damping rate of the vehicle suspension to a predetermined value on the basis of the variation of the damping rate, wherein the spring rate variable correction means corrects the apparent spring rate by an amount proportional to variation in an aerodynamic force due to displacement of an attitude of the vehicle body, wherein the aerodynamic force is dependent on the vehicle running speed and an aerodynamic characteristic which is determined on the basis of a configuration of the vehicle body.

2. The suspension control device as claimed in claim 1, wherein the aerodynamic characteristic is represented by an aerodynamic derivative corresponding to a variation rate for at least one of a heaving displacement and a pitching angular displacement for a lift coefficient and a pitching moment coefficient.

3. The suspension control device as claimed in claim 1, wherein the apparent spring rate variation is determined on the basis of a second power of the vehicle running speed and a proportional constant, with a time-variation of the attitude of the vehicle held substantially invariable irrespective of variation of the vehicle running speed.

4. The suspension control device as claimed in claim 3, wherein the proportional constant ($\alpha$) is set to the following ranges when the vehicle is a passenger car whose height is less than 1.7 m, where f and r represent front and rear wheel suspension, respectively, and the unit is $N.S^2/m^3$ $\alpha_f = 0.5$ to 1.4, and $\alpha_r = 0.2$ to 0.5.

5. The suspension control devices as claimed in claim 3, wherein the proportional constant ($\beta$) is set to the following ranges when the vehicle is a passenger car whose height is above 1.7 m, where f and r represent front and rear wheel suspension, respectively, and the unit is $N.S^2/m^3$ $\beta_f = 0.2$ to 1.7, and $\beta_r = -2.7$ to $-1.2$.

6. The suspension control device as claimed in claim 3, wherein the apparent spring rate variation is calculated as a function of the vehicle running speed.

7. The suspension control device as claimed in claim 3, wherein the apparent spring rate variation is beforehand stored in a map format as a correction amount for a representative vehicle running speed.

8. The suspension control device as claimed in claim 3, wherein said spring rate variable correction means comprises a piston rod having one end secured to a suspension arm and the other end secured to a vehicle body, an air chamber whose volume is variable in accordance with a stretching and contracting motion of said piston rod, a supply source for supplying air to said air chamber, valve means for varying the spring rate by supplying and discharging air to and from said air chamber, and control means for controlling opening and closing operations of said valve means.

9. The suspension control device as claimed in claim 1, wherein the damping rate variable correction means corrects the apparent damping rate in proportion to a variation in aerodynamic force due to displacement velocity of an attitude of the vehicle, wherein the aerodynamic force is dependent on the vehicle running speed and an aerodynamic characteristic which is determined on the basis of a configuration of the vehicle body.

10. The suspension control device as claimed in claim 1, wherein the aerodynamic characteristic is represented by an aerodynamic derivative corresponding to a proportional constant for at least one of a heaving displacement and a pitching angular displacement for a lift coefficient and a pitching moment coefficient.

11. The suspension control device as claimed in claim 1, wherein the apparent damping rate variation is determined on the basis of the vehicle running speed and a proportional constant, and the time-variation of the attitude of the vehicle is substantially invariable irrespective of variation of the vehicle running speed.

12. The suspension control device as claimed in claim 11, wherein the proportional constant ($\gamma$) is set to the following ranges when the vehicle is a passenger car whose height is less than 1.7 m, where f and r represent front and rear wheel suspension, respectively, and unit is $N.S^2/m^2$ $\gamma_f = -2.5$ to $-1.8$, and $\gamma_r = -0.5$ to $-0.1$.

13. The suspension control devices as claimed in claim 12, wherein the proportional constant ($\gamma$) is set to the following ranges when the vehicle is a passenger car whose height is above 1.7 m, where f and r represents front and rear wheel suspension, respectively, and the unit is $N.S^2/m^2$ $\gamma_f = -1.9$ to $-0.5$, and $\gamma_r = 1.0$ to 3.0.

14. The suspension control device as claimed in claim 11, wherein the apparent damping rate variation is calculated as a function of the vehicle running speed.

15. The suspension control device as claimed in claim 11, wherein the apparent damping rate variation is beforehand stored in a map format as a correction amount for a representative vehicle running speed.

16. The suspension control device as claimed in claim 11, wherein said damping rate variable correction means comprises a piston rod having one end secured to a suspension arm and the other end secured to a vehicle body, damper means for generating a damping force in accordance with a stretching and contracting speed of said piston rod, variable diaphragm means for varying the diameter of a diaphragm aperture built in said damper means to adjust resistance against flow of damper oil passing through said diaphragm aperture, thereby varying the damping rate, and control means for controlling said variable diaphragm means to vary the diameter of the diaphragm aperture.

17. The suspension control device as claimed in claim 1, further comprising:
an external disturbance sensor for measuring an external disturbance on the basis of at least one of (a) displacement, velocity or acceleration of a heaving motion of the vehicle (b) angular displacement, angular velocity or angular acceleration of a pitching motion of the vehicle, (c) displacement, velocity or acceleration or an unsprung member, (d) a force applied to a spring mechanism and (e) a force applied to a damping mechanism,
wherein one of said spring rate variable correction means and said damping rate variable correction means variably corrects one of the apparent spring rate and the apparent damping rate to a predetermined value after a predetermined time elapse from a time when the external disturbance exceeds a predetermined value.

18. The suspension control device as claimed in claim 17, wherein the predetermined time is set to 0.2 to 0.3 second.

19. A spring rate setting method for a suspension, comprising the steps of:

measuring and calculating at least one of a variation of aerodynamic force due to a heaving motion of a vehicle and a variation of aerodynamic force due to a pitching motion of the vehicle;

solving an aerodynamic-force variation caused by displacement of a vehicle attitude in an equation of motion for the vehicle in which at least one of the variation in aerodynamic force due to heaving motion and the variation in aerodynamic force due to the pitching motion is considered as an apparent spring rate variation for a suspension, in an equation of motion for the vehicle in which no consideration is paid to the variation in aerodynamic force due to the heaving motion and the variation in aerodynamic force due to the pitching motion;

storing the apparent spring rate variation against vehicle running speed; and controlling the suspension by setting a spring rate of the suspension on the basis of a relationship between the apparent spring rate variation and the vehicle running speed, wherein the solution of said solving step is obtained in consideration of the aerodynamic force variation being equivalent to the equation of motion without consideration of the aerodynamic force variation, wherein the equivalence between the equations of motion corresponds to identity in a transient response characteristic of the vehicle attitude displacement which is represented by the equation of motion, and wherein the identity in transient response characteristic of the vehicle attitude displacement corresponds to substantial identity in time-variation of the vehicle attitude.

20. The spring rate setting method as claimed in claim 19, wherein said vehicle is an actual car.

21. The spring rate setting method as claimed in claim 19, wherein said vehicle is a model.

22. The spring rate setting method as claimed in claim 19, wherein the aerodynamic force is dependent on the vehicle running speed and an aerodynamic characteristic which is determined in accordance with a configuration of the vehicle body.

23. The spring rate setting method as claimed in claim 22, wherein the aerodynamic characteristic is represented by an aerodynamic derivative corresponding to a displacement rate for at least one of a heaving displacement and a pitching displacement for a lift coefficient and a pitching moment coefficient.

24. The spring rate setting method as claimed in claim 23, wherein the variation rate is a fixed value.

25. The spring rate setting method as claimed in claim 19 wherein the displacement of the vehicle attitude corresponds to at least one of the displacement of heaving motion and the angular displacement of the pitching motion.

26. The spring rate setting method as claimed in claim 19, wherein the solution is obtained on the basis of the variation in aerodynamic force due to the heaving or pitching motion.

27. The spring rate setting method as claimed in claim 19 wherein the solution is obtained using a method of least squares for the aerodynamic-force variations due to the heaving and pitching motions.

28. A damping rate setting method for a suspension, comprising the steps of:

measuring and calculating at least one of variation of aerodynamic force due to heaving motion of a vehicle and variation of aerodynamic force due to a pitching motion of the vehicle;

solving an aerodynamic-force variation caused by displacement velocity of a vehicle attitude in an equation of motion for the vehicle in which at least one of a variation in aerodynamic force due to the heaving motion and a variation in aerodynamic force due to the pitching motion is considered, as an apparent damping rate variation for a suspension in an equation of motion for the vehicle in which no consideration is paid to the variation in aerodynamic force due to the heaving motion and the variation in aerodynamic force due to the pitching motion;

storing the apparent damping rate variation against vehicle speed; and controlling the suspension by setting a damping rate of the suspension on the basis of a relationship between the apparent damping rate variation and the vehicle running speed, wherein the solution of said solving step is obtained in consideration of the aerodynamic force variation being equivalent to the equation of motion without consideration of the aerodynamic force variation, wherein the equivalence between the equations of motion corresponds to identity in a transient response characteristic of the displacement of vehicle attitude which is represented by the equation of motion, and wherein the identity in transient response characteristic of the vehicle attitude displacement corresponds to substantial identity in time-variation of the vehicle attitude.

29. The damping rate setting method as claimed in claim 28, wherein said vehicle is an actual car.

30. The damping rate setting method as claimed in claim 28, wherein said vehicle is a model.

31. The damping rate setting method as claim 28, wherein the aerodynamic force is dependent on vehicle running speed and an aerodynamic characteristic which is determined in accordance with a configuration of the vehicle body.

32. The damping rate setting method as claimed in claim 31, wherein the aerodynamic characteristic is represented by an aerodynamic derivative corresponding to a displacement rate for at least one of a heaving displacement and a pitching displacement for a lift coefficient and a pitching moment coefficient.

33. The damping rate setting method as claimed in claim 32, wherein the variation rate is a fixed value.

34. The damping rate setting method as claimed in claim 28, wherein the displacement of the vehicle attitude corresponds to at least one of the displacement of heaving motion and the angular displacement of the pitching motion.

35. The damping rate setting method as claimed in claim 34, wherein the angular displacement of the pitching motion is corrected in consideration of shift in the direction of a composite vector of a vehicle running speed, a heaving velocity and a pitching velocity.

36. The damping rate setting method as claimed in claim 28, wherein the solution is obtained on the basis of the variation in aerodynamic force due to the heaving or pitching motion.

37. The damping rate setting method as claimed in claim 28, wherein the solution is obtained using a method of least squares for the aerodynamic-force variations due to the heaving and pitching motions.

38. A spring rate setting method for a suspension, comprising the steps of:
- measuring and calculating at least one of a variation of aerodynamic force due to a heaving motion of a vehicle and a variation of aerodynamic force due to a pitching motion of the vehicle;
- deriving an apparent spring rate variation for a suspension of the vehicle from at least one of the variation in an aerodynamic force due to the heaving motion and the variation in aerodynamic force due to the pitching motion;
- storing the apparent spring rate variation against vehicle running speed; and
- controlling the suspension by setting a spring rate of the suspension on the basis of a relationship between the apparent spring rate variation and the vehicle running speed.

39. A damping rate setting method for a suspension, comprising the steps of:
- measuring and calculating at least one of a variation of aerodynamic force due to a heaving motion of a vehicle and a variation of aerodynamic force due to a pitching motion of the vehicle;
- deriving an apparent damping rate variation for a suspension of the vehicle from at least one of the variation in an aerodynamic force due to the heaving motion and the variation in aerodynamic force due to the pitching motion;
- storing the apparent damping rate variation against vehicle running speed; and
- controlling the suspension by setting a damping rate of the suspension on the basis of a relationship between the apparent damping rate variation and the vehicle running speed.

* * * * *